United States Patent
Zeng et al.

(10) Patent No.: US 11,037,445 B2
(45) Date of Patent: Jun. 15, 2021

(54) ROAD MATCHING BASED POSITIONING METHOD, CHIP SUBSYSTEM, AND ELECTRONIC DEVICE

(71) Applicant: Huawei Technologies Co., Ltd., Shenzhen (CN)

(72) Inventors: Dandan Zeng, Beijing (CN); Yongliang Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/827,134

(22) Filed: Mar. 23, 2020

(65) Prior Publication Data

US 2020/0226925 A1    Jul. 16, 2020

Related U.S. Application Data

(63) Continuation of application No. PCT/CN2019/091086, filed on Jun. 13, 2019.

(30) Foreign Application Priority Data

Oct. 15, 2018 (CN) .......................... 201811198358.4

(51) Int. Cl.
     *G08G 1/123* (2006.01)
(52) U.S. Cl.
     CPC .................................. *G08G 1/123* (2013.01)
(58) Field of Classification Search
     CPC ........... G08G 1/123; G08G 1/13; G08G 1/133
     USPC ........................................................ 340/988
     See application file for complete search history.

(56) References Cited

U.S. PATENT DOCUMENTS

| 2013/0311086 A1* | 11/2013 | Aoki ................... G01C 21/005 |
| | | 701/446 |
| 2015/0153183 A1* | 6/2015 | Kadous ................. G01C 21/32 |
| | | 701/532 |
| 2017/0018181 A1* | 1/2017 | Davidsson ......... G06Q 10/0835 |
| 2017/0132478 A1 | 5/2017 | Modica et al. |

FOREIGN PATENT DOCUMENTS

| CN | 101837172 A | 9/2010 |
| CN | 102102992 A | 6/2011 |
| CN | 102175254 A | 9/2011 |
| CN | 102997928 A | 3/2013 |

(Continued)

*Primary Examiner* — Qutbuddin Ghulamali
(74) *Attorney, Agent, or Firm* — Conley Rose, P.C.

(57) ABSTRACT

A road matching based positioning method includes obtaining coordinates of a current location after a positioning request of an application is received, searching a database for data of segments near the current location, determining a segment crosspoint based on start point coordinates and end point coordinates of the segments and respective attributes of the segments, and obtaining coordinates of the segment crosspoint, and performing road matching using a positioning point and a road network topology to obtain coordinates of the positioning point after correction, and sending the coordinates of the positioning point after correction to the application that presents the coordinates to a user. The road network topology can be reconstructed at an operating system layer by using simplified segment data, and a high-precision positioning service is implemented through road matching.

19 Claims, 16 Drawing Sheets

(56) References Cited

FOREIGN PATENT DOCUMENTS

| | | | |
|---|---|---|---|
| CN | 104165628 | A | 11/2014 |
| CN | 104422451 | A | 3/2015 |
| CN | 104567906 | A | 4/2015 |
| CN | 104634352 | A | 5/2015 |
| CN | 106570686 | A | 4/2017 |
| CN | 107869996 | A | 4/2018 |
| EP | 2664894 | A2 | 11/2013 |
| EP | 3271748 | A1 | 1/2018 |
| WO | 2016146641 | A1 | 9/2016 |

* cited by examiner

ROAD MATCHING BASED POSITIONING METHOD, CHIP SUBSYSTEM, AND ELECTRONIC DEVICE

CROSS-REFERENCE TO RELATED APPLICATIONS

This application is a continuation of International Patent Application No. PCT/CN2019/091086, filed on Jun. 13, 2019, which claims priority to Chinese Patent Application No. 201811198358.4, filed on Oct. 15, 2018, both of which are hereby incorporated by reference in their entireties.

TECHNICAL FIELD

This application relates to communications technologies, and more specifically, to a positioning method, a chip subsystem, and an electronic device.

BACKGROUND

As location services become popular in common people's daily life, importance of terminal device based positioning services becomes increasingly obvious. After obtaining a positioning signal received by a hardware layer component of a terminal device, an operating system of the terminal device obtains coordinates of a current location of the terminal device through calculation. However, in an urban area with densely packed high-rise buildings or in a tunnel-like scenario, a positioning signal may be partially or completely blocked, resulting in a positioning deviation and relatively poor performance of a positioning service. For example, when a mobile phone is in a scenario of densely packed high-rise buildings, dense vegetation blocking, or the like, a positioning signal is easily affected by multipath, refraction, and reflected signals, resulting in relatively low positioning precision and a deviation of over 50 meters. When the mobile phone has no signal in a tunnel scenario, it is likely to cause an overshoot because a current actual location is in a tunnel but a location of a positioning result is far away from the tunnel. Therefore, the positioning result provided by the operating system has a relatively large error in a scenario in which a signal is blocked or completely blocked, and consequently, when an application provides a service based on a location provided by the operating system, user experience is relatively poor.

SUMMARY

Embodiments of this application provide a road matching based positioning method, a chip subsystem, and an electronic device such that a road network topology can be reconstructed at an operating system layer of a terminal device using a reduced amount of segment data, to perform road matching on a positioning point to correct the positioning point, and when a location service is provided in a scenario in which a signal is blocked or completely blocked, an operating system can provide a high-precision positioning result, to provide better user experience.

To achieve the foregoing objective of the present disclosure, according to a first aspect, an embodiment of this application provides a road matching based positioning method, and the method includes obtaining coordinates of a positioning point in response to a positioning request of an application, obtaining data of segments near the coordinates of the positioning point, where the data of the segments includes attributes, start point coordinates, and end point coordinates of the segments, the data of the segments may be obtained by dividing a usual city of residence by area, an area in which the positioning point is located may be found based on the coordinates of the positioning point, the data of the segments in the area may be considered as the data of the segments near the positioning point, and the data of the segments in the usual city of residence may be pre-stored in a memory of a terminal device, determining, based on the start point coordinates and the end point coordinates of the segments near the coordinates of the positioning point, that the segments intersect, determining an intersection point as a segment crosspoint based on respective attributes of the intersected segments, and obtaining coordinates of the segment crosspoint, where the segment crosspoint represents an intersection or a road intersection formed by the segments, the attributes of the segments may include a tunnel attribute, an elevated road attribute, an inter change (IC) attribute, a joint change (JCT) attribute, a roundabout attribute, an auxiliary road attribute, and a common road attribute, performing road matching using the road network topology and the positioning point, to obtain coordinates of the positioning point after correction, where the road network topology includes the segments and the segment crosspoint, and sending the coordinates of the positioning point after correction to the application.

According to the road matching based positioning method provided in this embodiment of this application, high-precision positioning may be implemented at a bottom layer (for example, an operating system layer) through road matching, and a non-differential high-precision positioning result may be provided for a plurality of upper-layer applications. In other approaches, a positioning result provided by an operating system with relatively poor positioning accuracy is usually used to perform post-processing of correction at an application layer. A large amount of road network data is obtained during correction, and is not applicable to the operating system, because a size of a storage space allocated to the system is limited, and an online request for a large amount of road network data from a cloud causes a positioning service delay of 2 to 3 seconds. To resolve this problem, in this embodiment of this application, a reduced amount of road network data is pre-stored, and data of a segment with a reduced amount of data is obtained to reconstruct the road network topology such that positioning accuracy and a positioning speed can be improved.

In a possible implementation, segment data of one or more cities is obtained from the cloud, the cloud stores global segment data, the segment data of the one or more cities includes segment data in each area of the cities, and the areas are formed by dividing the cities based on longitudes and latitudes. The pre-stored road network data may be segment data of only one or more cities. When positioning is performed in a new city, an update of the stored road network data may be requested from a server.

In a possible implementation, the intersection formed by the segments is an intersection point existing when the intersected segments are not in head-to-tail connection, and the attributes of the intersected segments are common roads, and the head-to-tail connection indicates that a start point of one segment of the intersected segments coincides with an end point of another segment of the intersected segments.

In a possible implementation, the road intersection is an intersection point existing when the intersected segments are in head-to-tail connection, and the attributes of the intersected segments include a tunnel, or the attributes of the intersected segments are at least two of an elevated road, an IC, a JCT, or a roundabout, or the attributes of the intersected segments are a common road and an IC, or a common road and a roundabout.

In a possible implementation, the method includes identifying a road scenario in which the positioning point is located, where the road scenario includes an intersection scenario, a parallel road scenario, and a tunnel scenario, setting a weight value of an impact factor corresponding to the road scenario based on the road scenario, performing weighting calculation, based on the impact factor and the weight value of the impact factor, to obtain matching weight values of the segments near the positioning point, and selecting a segment with a maximum matching weight value from the segments as a matched segment, where a projected point of the positioning point on the matched segment is the positioning point after correction. Adjusting the weight value of the impact factor in different scenarios can enhance universality of the positioning method and improve robustness and accuracy of the positioning method.

In a possible implementation, the impact factor includes a distance from the positioning point to the segment, an angle difference between a direction of the segment and a movement direction of the positioning point, and a shape matching degree between a historical positioning track and the segment, where the historical positioning track is a track formed by a historical positioning point.

In a possible implementation, the impact factor further includes a road level or a speed limit difference.

In a possible implementation, a weight value of the shape matching degree between the historical positioning track and the segment in the intersection scenario is greater than a weight value of the shape matching degree in the parallel road scenario.

In a possible implementation, a weight value of the angle difference between the direction of the segment and the movement direction of the positioning point in the intersection scenario is greater than a weight value of the angle difference in the parallel road scenario.

In a possible implementation, the matched segment is a segment that is in the segments near the positioning point and that is connected to a matched segment of the historical positioning point using the segment crosspoint.

According to a second aspect, an embodiment of this application provides an electronic device, and the electronic device includes an obtaining module, a searching module, a segment crosspoint generating module, a road matching module, and a sending module. The obtaining module is configured to obtain coordinates of a positioning point in response to a positioning request of an application. The searching module is configured to obtain data of segments near the coordinates of the positioning point, where the data of the segments includes attributes, start point coordinates, and end point coordinates of the segments. The segment crosspoint generating module is configured to determine, based on the start point coordinates and the end point coordinates of the segments near the coordinates of the positioning point, that the segments intersect, determine an intersection point as a segment crosspoint based on respective attributes of the intersected segments, and obtain coordinates of the segment crosspoint, where the segment crosspoint represents an intersection or a road intersection formed by the segments. The road matching module is configured to perform road matching using a road network topology and the positioning point, to obtain coordinates of the positioning point after correction, where the road network topology includes the segments and the segment crosspoint. The sending module is configured to send the coordinates of the positioning point after correction to the application.

In a possible implementation, the searching module is further configured to obtain segment data of one or more cities from a cloud, the cloud stores global segment data, the segment data of the one or more cities includes segment data in each area of the cities, and the areas are formed by dividing the cities based on longitudes and latitudes.

In a possible implementation, the intersection formed by the segments is an intersection point existing when the intersected segments are not in head-to-tail connection, and the attributes of the intersected segments are common roads, and the head-to-tail connection indicates that a start point of one segment of the intersected segments coincides with an end point of another segment of the intersected segments.

In a possible implementation, the road intersection is an intersection point existing when the intersected segments are in head-to-tail connection, and the attributes of the intersected segments include a tunnel, or the attributes of the intersected segments are at least two of an elevated road, an IC, a JCT, or a roundabout, or the attributes of the intersected segments are a common road and an IC, or a common road and a roundabout.

In a possible implementation, the road matching module is configured to identify a road scenario in which the positioning point is located, where the road scenario includes an intersection scenario, a parallel road scenario, and a tunnel scenario, set a weight value of an impact factor corresponding to the road scenario based on the road scenario, perform weighting calculation, based on the impact factor and the weight value of the impact factor, to obtain matching weight values of the segments near the positioning point, and select a segment with a maximum matching weight value from the segments as a matched segment, where a projected point of the positioning point on the matched segment is the positioning point after correction.

In a possible implementation, the impact factor includes a distance from the positioning point to the segment, an angle difference between a direction of the segment and a movement direction of the positioning point, and a shape matching degree between a historical positioning track and the segment, where the historical positioning track is a track formed by a historical positioning point.

In a possible implementation, the impact factor further includes a road level or a speed limit difference.

In a possible implementation, a weight value of the shape matching degree between the historical positioning track and the segment in the intersection scenario is greater than a weight value of the shape matching degree in the parallel road scenario.

In a possible implementation, a weight value of the angle difference between the direction of the segment and the movement direction of the positioning point in the intersection scenario is greater than a weight value in the parallel road scenario.

In a possible implementation, the matched segment is a segment that is in the segments near the positioning point and that is connected to a matched segment of the historical positioning point using the segment crosspoint.

According to a third aspect, an embodiment of this application provides an electronic device, and the electronic device includes a processor and a computer-readable storage medium that stores a computer program. The processor is coupled to the computer-readable storage medium, and when being executed by the processor, the computer program implements the road matching based positioning method provided in the first aspect and any possible implementation of the first aspect.

According to a fourth aspect, an embodiment of this application provides a computer-readable storage medium, where a computer program is stored in the computer-readable storage medium, and when being executed by a processor, the computer program implements the road matching based positioning method provided in the first aspect and any possible implementation of the first aspect.

According to a fifth aspect, an embodiment of this application provides a chip subsystem, e.g. a system on chip (SOC), where the chip subsystem includes an application processor and a Global Positioning System (GPS) module configured to receive a positioning signal, and the application processor is configured to implement the road matching based positioning method provided in the first aspect and any possible implementation of the first aspect.

According to a sixth aspect, an embodiment of this application provides an electronic device, and the electronic device includes the chip subsystem provided in the fifth aspect.

According to a seventh aspect, an embodiment of this application provides a positioning chip, and the positioning chip includes a radio frequency module and a processor, where the radio frequency module is configured to receive a positioning signal, and the processor is configured to implement the road matching based positioning method provided in the first aspect and any possible implementation of the first aspect.

According to an eighth aspect, an embodiment of this application provides an electronic device, and the electronic device includes the positioning chip provided in the seventh aspect.

DETAILED DESCRIPTION OF EMBODIMENTS

Some key terms in this application are explained below. The GPS is an omnidirectional, round-the-clock, full-time, and high-precision satellite navigation system developed by the United States Department of Defense, can provide global users with low-cost and high-precision navigation information, such as a three-dimensional location, a speed, and precise timing, and is a typical application of satellite communications technologies in the navigation field. Global navigation satellite system (GNSS). The GNSS includes a GPS, such as the GPS of the United States, the Beidou of China, the Galileo of the European Union, and the Global Navigation Satellite System (GLONASS) satellite positioning system of Russia. Compact-model-map-road-matching (CMMRM). The CMMRM is a road network matching based positioning algorithm proposed by this patent. Location based service (LBS). The LBS includes various positioning-related information services that are provided for users based on locations of the users. Road network topology. The road network topology is a network structure that includes a segment and a segment crosspoint and that is abstracted from a real traffic network. Tile. A map is divided based on longitudes and latitudes, each divided regular area is referred to as a tile, and a road located in two tiles is broken by division. Segment. The segment is a line segment used to represent a road after the road in the real world is abstracted. A real road with a two-way driving direction may be abstracted as one segment or one curve including a plurality of segments that are connected head to tail. Segment crosspoint. The segment crosspoint is used to represent an intersection or a road intersection formed by segments, where the intersection is, for example, a T-type intersection, a crossroad, or a five-way intersection, and the road intersection is, for example, an entrance or exit of a tunnel, an intersection between an auxiliary road and a main road, or an intersection between an IC road or a JCT road and a highway. Elevated road. The elevated road usually refers to an urban space road 6 m above the ground. Generally, an elevated road and a common road on the ground form a multi-layered road system. IC. The IC is an entrance/exit of a highway, or is referred to as a ramp, the IC is a road connecting a highway and another road (such as a common road), and is the only entrance/exit of the highway, and internal roads of the highway are fully-closed roads, and can only be connected to a road of another level through the IC. JCT. The JCT is a highway connection port, and is a connection road between highways, or between a highway and an urban highway.

Figure 1:
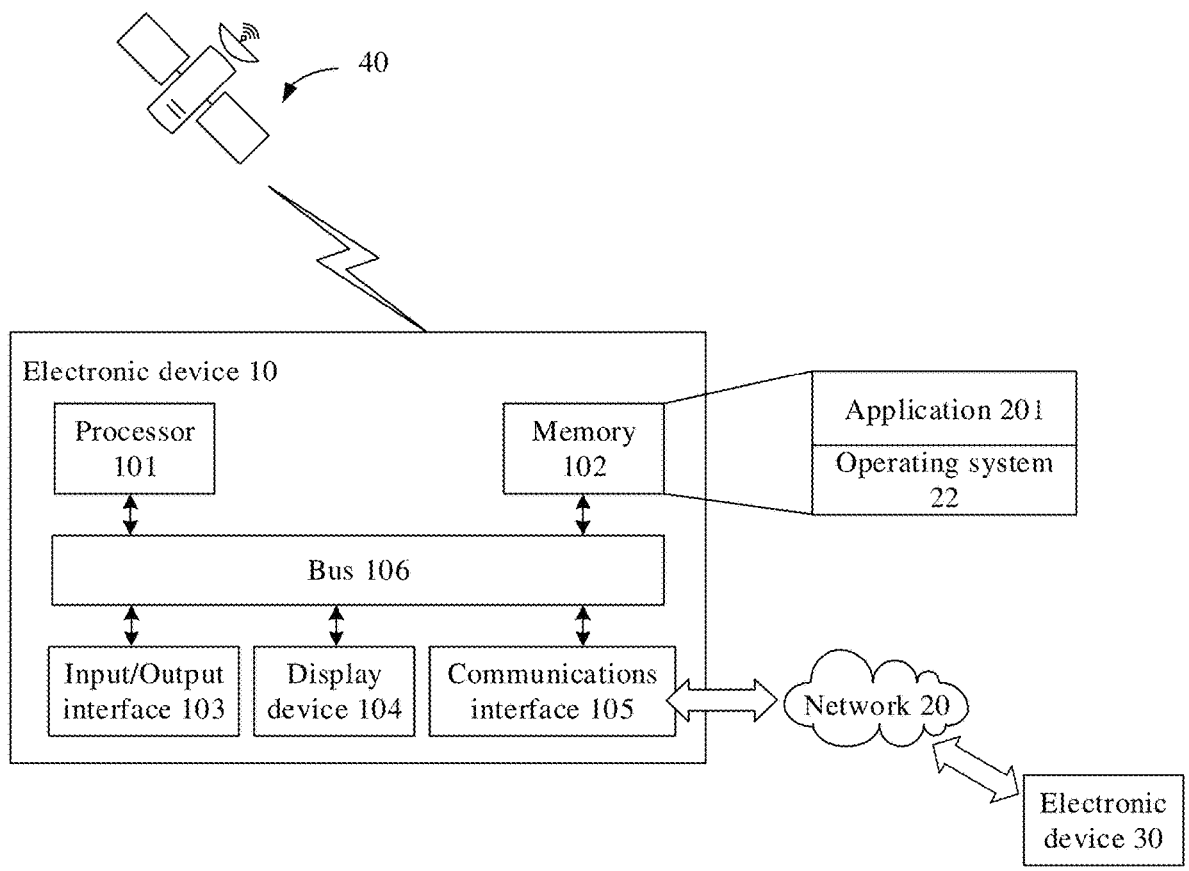
FIG. 1 is a schematic diagram of a communications system according to an embodiment of the present disclosure.

FIG. 1 is a communications system to which this application is applicable. It should be noted that the system in FIG. 1 is merely an example of a possible system, and a disclosed implementation solution may be implemented in any one of various systems as required.

As shown in FIG. 1, the system includes an electronic device 10, and may further include a network 20, an electronic device 30, and a satellite 40.

The electronic device 10 may receive a radio signal from the satellite 40, and may implement multi-source fused positioning, in an embodiment, perform positioning by fusing a plurality of types of positioning signals such as a satellite positioning signal, an inertial navigation signal, and a network positioning signal. The electronic device 10 and the electronic device 30 may be communicatively connected through the network 20, where the network 20 may be a wireless local area network or a mobile network. A communication connection is established between the electronic device 10 and the electronic device 30 based on a specific communications protocol, and then data is transmitted in a unit of a data packet based on the established connection. In a transmission process, a data packet may pass through one or more network devices in the network 20, for example, an access network device, a routing device, or an access point (AP).

The electronic device 10 may be a terminal device, and specifically, may be any computer system or device in various types of computer systems or devices that are mobile or portable and that perform wireless communication. For example, the electronic device 10 may be a mobile phone or a smartphone (for example, an iPhone™, an Android™-powered phone), a vehicle-mounted terminal device, a portable game device (for example, a Nintendo DS™, a PlayStation Portable™, a Gameboy Advance™, or an iPhone™), a laptop computer, a personal digital assistant (PDA), a portable Internet device, a music player, a data storage device, another handheld device, or a wearable device such as a wrist watch, a headset, a pendant, and an earpiece. The electronic device 30 may be a terminal device or a server, and specifically, may be a cloud server, a proxy server, or another server communicatively connected with the proxy server. In this embodiment provided in the present disclosure, the electronic device 30 may be a cloud server that provides full road network data, and the electronic device 10 may request a part of the road network data from the cloud server 30 through the network 20. A person skilled in the art may understand that one communications system may usually include fewer or more components than components shown in FIG. 1, or include a component different from the components shown in FIG. 1. FIG. 1 merely shows the components more related to a plurality of implementations disclosed in this embodiment of this application.

The electronic device 10 includes components such as a processor 101, a memory 102, an input/output interface 103, and a communications interface 105. A person skilled in the art may understand that the electronic device 10 may include more or fewer components than those shown in the figure, or combine some components.

These components may communicate using one or more buses 106 or signal lines. The buses may include an address bus, a data bus, a control bus, and the like.

The processor 101 may be a central processing unit (CPU), a network processor (NP), or a combination of a CPU and an NP. The processor 101 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. Optionally, the processor 101 may include one or more processing units.

The memory 102 is configured to store a computer program, such as an application 201 and an operating system 22 that are shown in FIG. 1. The processor 101 may invoke the computer program stored in the memory 102, to implement a function defined by the computer program. For example, the processor 101 executes the operating system 22, to implement various functions of the operating system on the electronic device 10. The operating system 22 may be Linux®, Windows®, iOS®, Android®, or another operating system. This is not limited in this embodiment of this application.

The memory 102 further stores other data in addition to the computer program, such as data generated during running of the operating system 22 and the application 201. The memory 102 may include a volatile memory, for example, a random-access memory (RAM). The memory 102 may also include a non-volatile memory, for example, a flash memory, a hard disk drive (HDD), or a solid-state drive (SSD). The memory 102 may further include a combination of the foregoing types of memories. FIG. 1 shows only one memory. Certainly, the memory 102 may also be replaced by a plurality of storage devices as required. The memory 102 may be alternatively a memory in the processor 101. This is not limited herein.

The input/output interface 103 forwards a command or data input by a user using an input/output device (such as a sensor, a keyboard, or a touchscreen).

A display device 104 displays various types of information to the user. In this embodiment of the present disclosure, a final positioning result is displayed on an interface of a positioning application.

The communications interface 105 is hardware that is configured to connect the electronic device 10 to another electronic device, and allow the electronic device 10 to communicate on a network. For example, the communications interface may be connected to the network in a wired or wireless manner to connect to another external terminal or server. Wireless communication may use any communications standard or protocol, including but not limited to a GPS, a global system for mobile communications (GSM), a general packet radio service (GPRS,), a code division multiple access (CDMA), a wideband code-division multiple access (WCDMA), long term evolution (LTE), an email, a short message service (SMS), WI-FI, BLUETOOTH (BT), near field communication (NFC), and the like. In a terminal device, the communications interface 105 may be specifically a modem, an antenna, a WI-FI module, or a GPS module. The communications interface 105 may also be integrated with a processor and a memory (including a RAM and a read-only memory (ROM)).

Figure 2:
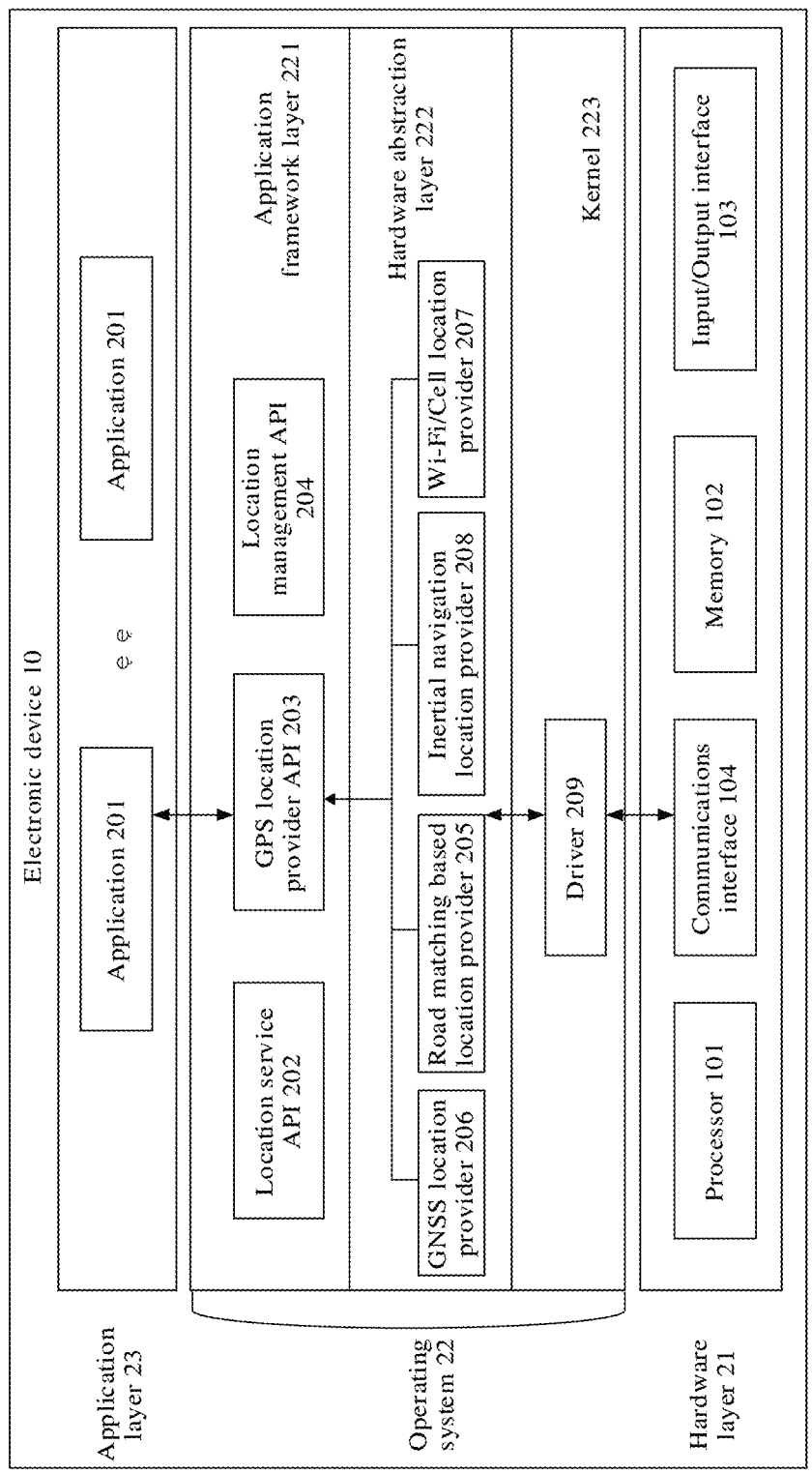
FIG. 2 is a schematic diagram of an electronic device according to an embodiment of the present disclosure.

Further, in an embodiment, as shown in FIG. 2, the electronic device 10 may be logically divided into a hardware layer 21, an operating system 22, and an application layer 23. The hardware layer 21 includes hardware resources such as the processor 101, the memory 102, the input/output interface 103, and the communications interface 104 that are described above. The application layer 23 includes one or more applications, for example, an application 201. The operating system 22 serves as a software middleware between the hardware layer 21 and the application layer 23, and is a computer program that manages and controls hardware and software resources.

Using an ANDROID operating system as an example, the operating system 22 may include an application framework layer 221, a hardware abstraction layer 222, and a kernel 223. The kernel 223 is configured to provide a bottom-layer system component and a service, and may include some drivers 209. The hardware abstraction layer 222 may encapsulate the drivers of the kernel, thereby shielding differences between different hardware devices, and providing a unified interface for accessing the hardware devices for the operating system 22.

The application framework layer 221 includes the hardware abstraction layer 222, a positioning service application programming interface (API) 202, a GPS location provider API 203, and a location management API 204. The GPS location provider API 203 may be a standard GPS location provider API in an ANDROID system, and is configured to obtain a fused fix solution (coordinates of a positioning point) provided by the hardware abstraction layer 222, where the fused fix solution may fuse location information provided by a plurality of location providers, and send the location information to each type of application 201. The location management API 204 may be a standard location manager service API in the ANDROID system, and may be configured to obtain and invoke a positioning service. The positioning service API 202 is an API provided in the road matching based positioning method provided in this embodiment of this application, and is configured to perform level-1 caching on data of one or more cities. A size of a cache space is limited by a size of a storage space allocated by an operating system to each system module. For example, a maximum file that may be allowed for storage does not exceed 1 megabyte (Mbyte). In addition, the location service API 202 may provide a data update interface for road network data required in the positioning method provided in this embodiment of this application, and is configured to send a road network data update request to the cloud server 30, where the cloud server 30 stores global road network data.

The hardware abstraction layer 222 may include a road matching based location provider 205, and may further include a GNSS location provider 206, an inertial navigation location provider 208, and a WI-FI/cell location provider 207. The road matching based location provider 205 is configured to perform the road matching based positioning method provided in this embodiment of this application, may respond to a positioning request of the application 201, and may input coordinates of a positioning point that are provided by one or more of the GNSS location provider 206, the inertial navigation location provider 208, and the WI-FI/cell location provider 207 as coordinates of an original positioning point, and then fuse an output positioning result with positioning results provided by the GNSS location provider 206, the inertial navigation location provider 208, and the WI-FI/cell location provider 207. A fused fix solution is sent to each application 201 using the GPS location provider API. The GNSS location provider 206, the inertial navigation location provider 208, and the WI-FI/cell location provider 207 may respond to the positioning request of the application 201, obtain, using the driver 209, a positioning signal provided by a corresponding hardware layer device, and obtain respective positioning results after resolving the positioning signal. The road matching based location provider 205 may further send, to the application 201 using the GPS location provider API 203, coordinates of a positioning point that are obtained after correction is performed using the road matching based positioning method provided in this embodiment of this application.

The application 201 includes applications requiring location information, such as dedicated positioning software, various e-commerce shopping applications, various social communication application software, various vehicle application software, O2O onsite service application software, an exhibition hall self-service tour application, family anti-lost application software, emergency rescue service software, audio and video entertainment software, and game software.

In an embodiment, the hardware abstraction layer 222 may run in an independent kernel in an electronic device 20, and run independently of an operating system in order to optimize power consumption and a memory of the electronic device 20.

In other approaches, road matching is usually executed by an application at an application layer, and road network matching is performed by invoking road network data stored in a memory or by invoking road network data stored in a cloud server, to implement high-precision positioning. Using an application that is commonly used in a terminal and has a positioning service as an example, when a navigation positioning application (APP) (such as AUTONAVI map APP or BAIDU map APP) and a life information APP (such as DIANPING APP or MEITUAN APP) need a positioning service, respective road network data needs to be invoked using respective APIs, that is, post-processing is performed on location information provided by an operating system. Various applications perform post-processing on original location information in different manners, and positioning results cannot serve as references for each other. A high-precision positioning result provided by the AUTONAVI map APP cannot be applied to a positioning service of the DIANPING APP, because positioning precision is differentiated between the applications. However, the positioning method provided in this embodiment of this application may be implemented at an operating system level, is not limited to an upper-layer application, and can provide high-precision positioning for all types of applications that need a positioning service. However, at the operating system level, an amount of data that can be invoked by each module of a system is limited. In the positioning method provided in this embodiment of this application, only a small amount of data of a segment may be invoked, coordinates of a segment crosspoint are calculated on line, a road network topology is reconstructed, and road matching is implemented, thereby improving positioning precision and positioning efficiency.

Figure 3:
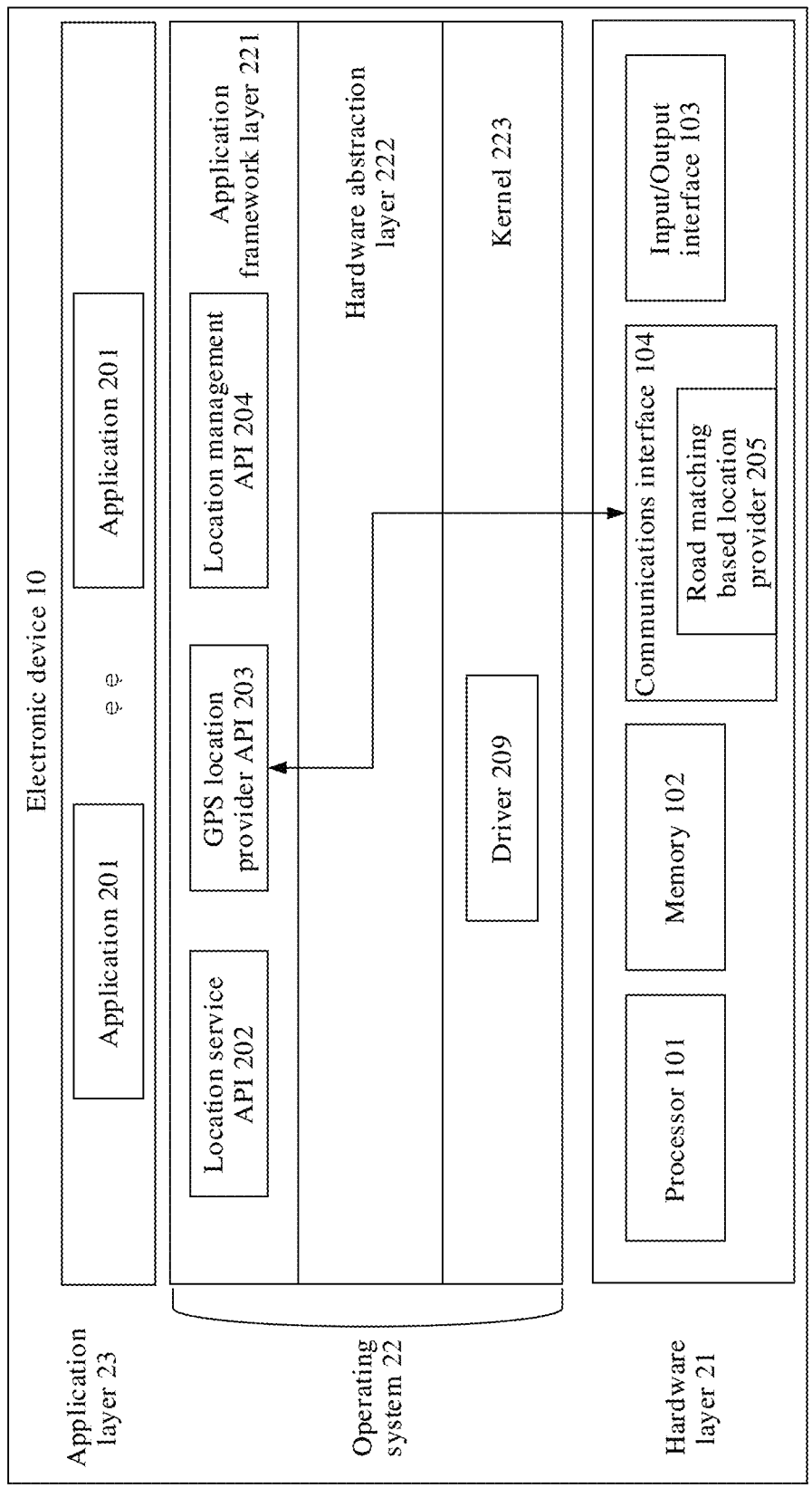
FIG. 3 is a schematic diagram of an electronic device according to an embodiment of the present disclosure.

In an embodiment, the electronic device 20 may offload a function of the positioning module 205 to the communications interface 104. As shown in FIG. 3, the communications interface 104 is a programmable communications interface, and the positioning module 205 is implemented in the programmable communications interface 104, for example, implemented in a positioning chip. Correspondingly, the positioning method provided in this embodiment of this application may be implemented using the communications interface 104. Specifically, the method may be implemented by modifying hardware or firmware of the communications interface 104. A computer program may be stored in a memory integrated on the programmable communications interface 104, and a processor integrated on the programmable communications interface 104 executes the computer program to implement the positioning method provided in this application. Alternatively, the positioning method provided in this application may be implemented using a logic circuit in the programmable communications interface 104.

Figure 4:
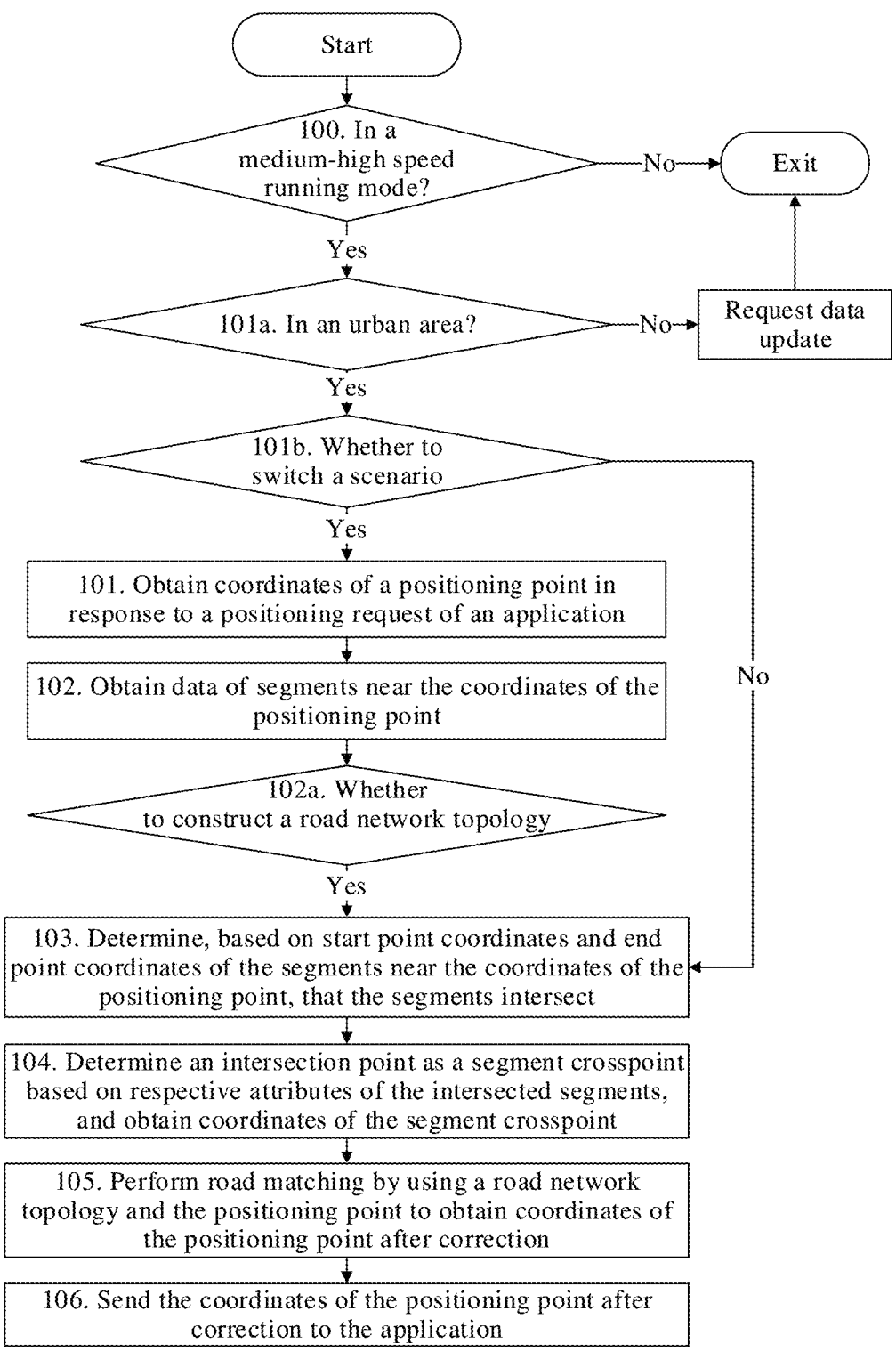
FIG. 4 is a schematic flowchart according to an embodiment of the present disclosure.

The following describes in detail the road matching based positioning method provided in this embodiment of this application. A flowchart of the positioning method is shown in FIG. 4, and the positioning method includes the following steps.

101. Obtain coordinates of a positioning point in response to a positioning request of an application.

When a user needs a positioning service, the application sends the positioning request, where the positioning request is used to obtain geographic coordinates of a current location. In response to the positioning request, coordinates of an original positioning point that are converted from a positioning signal collected by a hardware layer component may be obtained from a hardware layer. The hardware layer component may be specifically an antenna, a radio frequency module in a GPS module, or an inertial navigation sensor. The obtained coordinates of the positioning point may be coordinates obtained after fusion of one or more positioning results provided by a GNSS, a WI-FI/cell, the inertial navigation sensor, or another positioning method. Specifically, the coordinates of the positioning point may be geographic coordinates including a longitude and a latitude. For example, after receiving a GPS signal transmitted by a satellite, a radio frequency module in a terminal resolves the GPS signal to generate the coordinates of the positioning point. Optionally, a movement direction or speed of the positioning point may further be obtained.

Optionally, before the following steps are performed, the positioning method may further include step 100. Determine, based on a current moving speed, whether the positioning point is in a medium-high speed running mode, and if the positioning point is in the medium-high speed running mode, continue to perform the following steps, or if the positioning point is not in the medium-high speed running mode, exit the positioning method provided in this embodiment of this application, and select another positioning method. The positioning method provided in this embodiment of this application may be applied to a positioning service in a vehicle driving scenario. When a moving speed reaches a preset threshold, after the positioning service is enabled, the positioning method provided in this embodiment of this application may be performed, to implement precise positioning.

Optionally, after step 101, the positioning method may further include step 101*a*. Determine whether the positioning point is located in an urban area in which urban road network data is stored, and if the positioning point is not located in the urban area, request a data update from a cloud server. The electronic device 10 providing the positioning service stores road network data (data of segments) of a usual city of residence, and when a positioning service is required outside areas of the city, the electronic device 10 requests a data update from the cloud server. Specifically, a user may download road network data of a city in which the user is currently located to local storage.

Optionally, after step 101, the positioning method may further include step 101*b*. Determine whether to perform scenario switching, and if scenario switching needs to be performed, continue to perform step 102 and subsequent steps, or if scenario switching does not need to be performed, perform step 104, and perform road matching based on a current scenario, to implement positioning point correction.

102. Obtain data of segments near the coordinates of the positioning point, where the data of the segments includes attributes, start point coordinates, and end point coordinates of the segments.

Further, road network data near the coordinates of the positioning point may be searched for, using the coordinates of the positioning point, in a road network database stored in the electronic device 10. The road network database stores data of a plurality of segments. Specifically, the data of the segments includes start point coordinates and end point coordinates of the segments, angles of the segments, lengths of the segments, and attributes and driving directions of roads represented by the segments. The attributes of the roads may include a tunnel road, an elevated road, a common road, an IC road, a JCT road, an auxiliary road, a main road, and the like. The driving directions of the roads include a one-way direction and a two-way direction. The angle of the segment is an included angle between an X axis and the segment in a clockwise direction, where a start point of the segment is used as an origin, and a due north direction is used as the X axis. In other approaches, road network data obtained before road matching includes a large amount of data, for example, data of a road link and a road node. The data of the road link includes endpoint coordinates of the road link, an ID of the road link, and various attributes of the road link. The data of the road node includes an ID of a road link connected to the road node and coordinates of the road node. The amount of the data is huge, and therefore usually exceeds a capacity limit of a terminal. However, in consideration of a limitation of an operating system level on a stored data volume, the road network database mentioned in this embodiment of this application provides a simplified data structure, and stores only the data of the segments.

Figure 5:
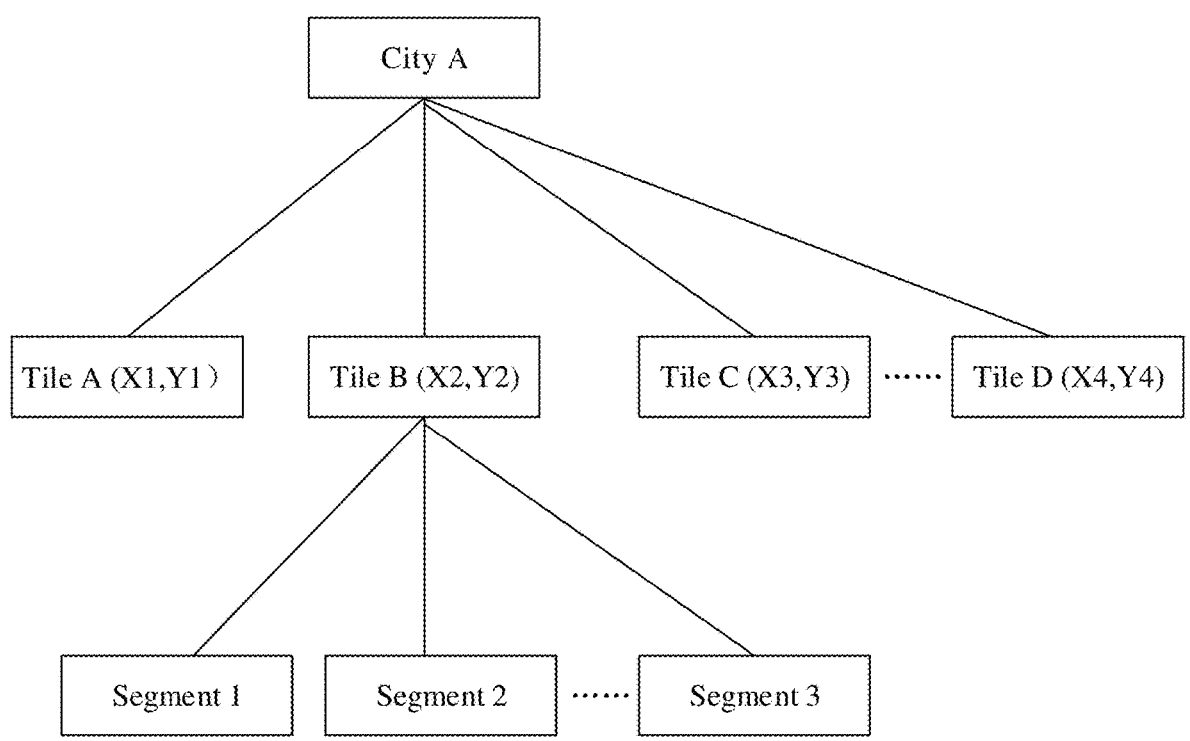
FIG. 5 is a schematic diagram of a data structure according to an embodiment of the present disclosure.

Optionally, an area (tile) corresponding to the coordinates of the positioning point may be searched for in the road network database based on the coordinates of the positioning point. The tile area includes data of a plurality of segments in the tile area, and segments near the positioning point are searched for in the tile area corresponding to the positioning point. Coordinates of any positioning point correspond to a unique tile in the road network database. For example, the data structure of the road network database may be shown in FIG. 5, and presents a three-layer structure city-tile-segment. The road network data may be divided by city. Road network data of each city includes data of a plurality of tile areas, and data of each tile area includes two-dimensional coordinates (X, Y) of the tile, and may further include data of a plurality of segments within a coverage area of the tile area. The two-dimensional coordinates (X, Y) of the tile are also used to name a tile file to distinguish a global number of the tile, and may be calculated using a geographic coordinate range of the tile area. The data of the segment is used to represent information about a road, and includes relative coordinates of a start point and an end point of the segment. The relative coordinates of the segment represent a location offset of the geographic coordinates of the segment relative to geographic coordinates of a center point of the tile area. The data of the segments further includes lengths of the segments, angles of the segments, driving direction attributes and road attributes of the roads represented by the segments, and the like. The driving direction attributes include a one-way direction, a two-way direction, a driving direction limitation, and the like. The road attributes may include attributes such as a tunnel, an elevated road, an auxiliary road, an IC road, a JCT road, and a common road. The tile area is a regular area formed by cutting map data based on longitudes and latitudes, and the segment is a line segment representing a real road. For example, a curved real road may be abstracted as a curve segment including a plurality of segments that are connected head to tail.

In another embodiment, the data structure of the road network database may be presented as a city-segment structure, and segments are divided by city. Segments near the coordinates of the positioning point are searched for in all segments in the city in which the coordinates of the positioning point are located.

In another embodiment, data of the segments near the coordinates of the positioning point may be traversed in the road network data based on the coordinates of the positioning point.

Optionally, all segments within a preset range and a segment that is intersected with a boundary of the preset range may be selected as the segments near the coordinates of the positioning point using the coordinates of the positioning point as an origin, for example, within a circular range with a radius of 70 meters using the positioning point as an origin, or within a rectangular range with a side length of 70 meters using the positioning point as a rectangular center point.

103. Determine, based on start point coordinates and end point coordinates of the segments near the coordinates of the positioning point, that the segments intersect.

Optionally, before step 103, the positioning method further includes step 102a. Determine whether to calculate a segment crosspoint. Further, whether a new segment crosspoint needs to be calculated again may be determined based on a distance between the positioning point and an end point of a segment matched with the positioning point. If the distance between the positioning point and the end point of the segment matched with the positioning point is greater than a specific distance, for example, the positioning point is moving on a conventional road, and is far away from the end of the road, it is unnecessary to recalculate the segment crosspoint in this case, and a segment crosspoint calculated in a historical record can be still used to perform subsequent road matching and positioning and correction. If the distance between the positioning point and the end point of the segment matched with the positioning point is less than or equal to the specific distance, a segment crosspoint needs to be reconstructed, that is, step 103 is performed.

Further, a calculation method for calculating, based on known end point coordinates, whether two line segments intersect is a common calculation method in geometric calculation, and is not specifically described herein.

104. Determine an intersection point as a segment crosspoint based on respective attributes of the intersected segments, and obtain coordinates of the segment crosspoint, where the segment crosspoint represents an intersection or a road intersection formed by the segments.

For any two segments, it may be determined, based on road attributes of the segments, whether roads represented by the segments form a segment crosspoint. If the roads respectively represented by the two segments form a segment crosspoint, coordinates of the segment crosspoint are recorded. Specifically, the coordinates may be relative coordinates, or may be converted into geographic coordinates, or longitude and latitude coordinates.

Further, the intersection may include a crossroad, a T-type intersection, a five-way intersection, and the like. The road intersection may be a junction of a tunnel and another road, or an intersection of an IC road, a JCT road, and a high-speed/elevated road, or an intersection of an IC road and a common road, or an intersection of an IC road, a common road, and a roundabout road.

105. Perform road matching using a road network topology and the positioning point to obtain coordinates of the positioning point after correction, where the road network topology includes the segments and the segment crosspoint.

The segments and the segment crosspoint may form the road network topology, and the road network topology reflects a connection relationship of roads around the positioning point. Road network matching is performed between the positioning point and the road network topology, the positioning point is projected to a matched segment, and a matched point of the positioning point on the matched segment is the positioning point after correction.

Optionally, a road scenario in which the positioning point is located may be identified using the road network topology, and a corresponding manner of searching for the matched segment may be set based on different road scenarios.

106. Send the coordinates of the positioning point after correction to the application.

The coordinates of the positioning point after correction are sent to the application through an interface. In other approaches, coordinates of an original positioning point that are obtained by resolving a positioning signal are usually directly sent to the application, and the provided coordinates of the original positioning point have a relatively large error, and cannot meet a high-precision positioning requirement. In the road matching based positioning method provided in this embodiment of this application, the original positioning point is corrected before being provided to the application, a high-precision positioning service can be provided from an operating system layer, and a same high-precision positioning result can be provided to a plurality of applications at the application layer. In addition, in consideration of a limited amount of data that can be stored in an operating system, the road network topology is reconstructed using a reduced amount of data.

Figure 6:
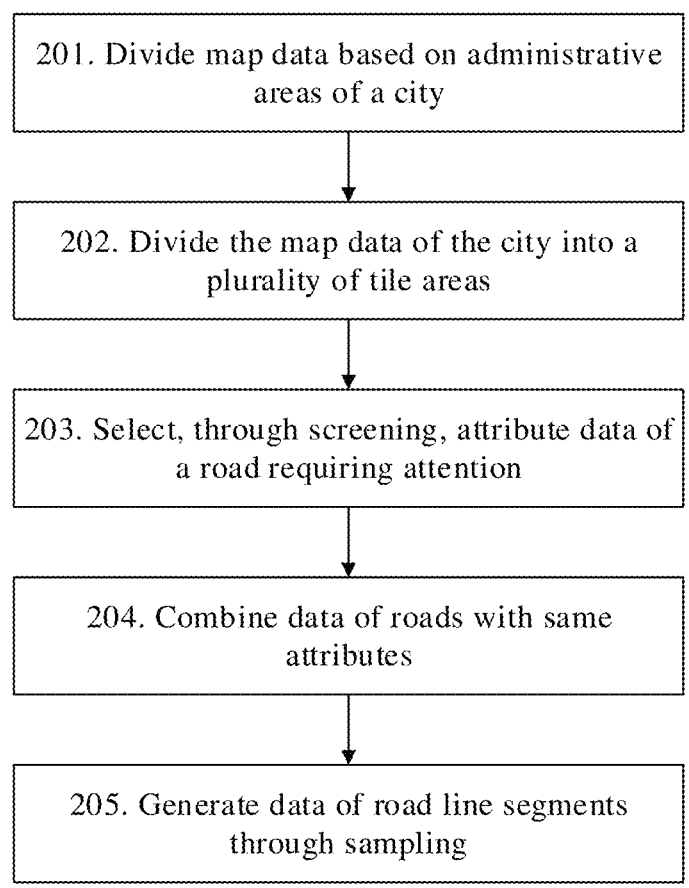
FIG. 6 is a schematic flowchart according to an embodiment of the present disclosure.

Before step 102, the positioning method may further include a process of generating the road network database. As shown in FIG. 6, the process of generating the road network database may include the following steps.

Step 201. Divide map data.

Global map data of a standard specification provided by a map provider (a data provider, such as AUTONAVI or NAVINFO in China, or a data provider, such as OSM, HERE, or google outside China) is first obtained. The map data includes common information of roads in each region and city, for example, sign information on the roads and coordinates of geometry points of the roads. The geometry point abstracts a real road into a curve line or a straight line using a line segment between points, and the coordinates of the geometry point may be geographic coordinates of the point, and specifically, may be longitude and latitude coordinates. The global map data of the standard specification can be divided by administrative districts of cities, for example, Chicago, Shanghai, and San Francisco, and map data of each city can be obtained through division.

Step 202. Divide divided map into a plurality of areas.

Map data of each city is divided based on geographic coordinates. Specifically, the map data may be divided based on latitude and longitude coordinates. Each area with a regular shape obtained through division may be referred to as a tile, and a real road may be broken by division in different tiles. Optionally, tile areas have different division levels, and the tile areas obtained through division based on different division levels have different coverage areas. An example of the division level of a tile area and a rough coverage area corresponding to the tile area is shown in Table 1.

TABLE 1

| Tile division level | Coverage area |
| --- | --- |
| Level 11 | 10 kilometers (km)*10 km |
| Level 12 | 5 km*5 km |
| Level 13 | 2.5 km*2.5 km |

Each tile area is assigned a unique global number X-Y for storage and search. An example of a conversion formula for geographic coordinates and the global number of the tile area is as follows: global number x axis: Floor (((longitude+180.0)*3600.0)/level) global number y axis: Floor (((90.0−latitude)*3600.0)/level).

Level represents the division level of the tile, and floor represents a calculation formula for rounding down. For example, if the tile area is a regular grid, longitude represents a longitude of a point in the lower left corner of the grid, and latitude represents a latitude of the point in the lower left corner of the grid.

Step 203. Select, through screening, attribute data of a road requiring attention.

Attributes of the road requiring attention include a driving direction, a road type, a traffic restriction (for example, no turning), and the like.

Step 204. Combine data of roads with same attributes.

The roads with the same attributes are combined, and roads whose angle differences between adjacent roads are within a specific range are combined.

Step 205. Generate data of segments through sampling.

Sampling is performed on common road geometry point data using, for example, a Douglas distance, to obtain geographic coordinates of start points and end points of the segments, lengths of the segments, angles of the segments, driving direction attributes and road types of roads represented by the segments, and the like. The geographic coordinates herein are absolute coordinates in a global geographic coordinate system.

The processing steps described in steps 203 to 205 are common map data processing methods, and are not described in detail herein.

Optionally, after step 205, step 206 may be further included. Perform offset and compression processing on the data of the segments. Coordinate offset processing is performed on geographic coordinates of all segments in a tile area. Relative coordinates from the geographic coordinates of the segments to geographic coordinates of a center point of the tile area are calculated using the center point of the tile area as an origin. Finally, only the relative coordinates are stored during data storage, which can greatly reduce a data storage volume. In addition, corresponding floating-point data is rounded for further compression.

Therefore, the data stored in the road network database may include data of a plurality of segments in each tile area, and specifically, includes relative coordinates of start points and end points of the segments, lengths of the segments, angles of the segments, driving direction attributes and road attributes of roads represented by the segments, and the like. Each tile area can be found based on the global number X-Y.

In this embodiment provided in this application, after the coordinates of the positioning point are obtained in step 101, in step 102, the coordinates of the positioning point may be substituted into the conversion formula of the geographic coordinates and the global number of the tile area, to obtain a global number corresponding to the coordinates of the positioning point, and data of all segments in a tile area corresponding to the global number may be searched for in the road network database based on the global number. In another embodiment, the segments near the positioning point may be directly traversed in the road network database based on the coordinates of the positioning point.

In this embodiment provided in this application, the generated global road network data may be stored in the cloud server 30. However, limited by a file storage space allocated by an operating system of a mobile phone to each system module, for example, a maximum file that is allowed for storage in the electronic device 10 by the positioning service API 202 does not exceed 1 Mbyte. Therefore, the electronic device 10 may store only road network data of a part of areas of some cities or one city, and the road network data is updated periodically or as required. For step 102, data of segments in a found tile area corresponding to the positioning point may be cached. For the terminal, the data cached in a memory may not exceed 10 k. Therefore, the cached data may be data of one tile or data of a plurality of tiles. The data herein is stored at a plurality of levels. A data size is reduced level by level, which not only meets a limitation of the memory on the data size, but also ensures validity of the data using only the road network data near the positioning point for operation.

Road network data used in an existing positioning function is bound to a map application, and is obtained using an online request, and limited by a large amount of data, processing of only data in a small range can be ensured. Alternatively, a correction result is obtained directly through an online service, and is delayed by 2 to 3 seconds such that the data cannot be obtained in real time. Therefore, road matching based real-time correction at a mobile phone side cannot be supported. A simplified structure of the road network data provided in this embodiment of this application reduces a data volume of the road network data such that road network data of a specific quantity of cities can be preset in an electronic device without affecting running of a system of the electronic device, and road network data of a usual place of residence is periodically updated based on a location of a user, to implement offline road matching and positioning functions in the usual place of residence. In addition, the simplified structure supports incremental update and maintenance of data through an online cloud service, thereby preventing data aging.

Figure 7:
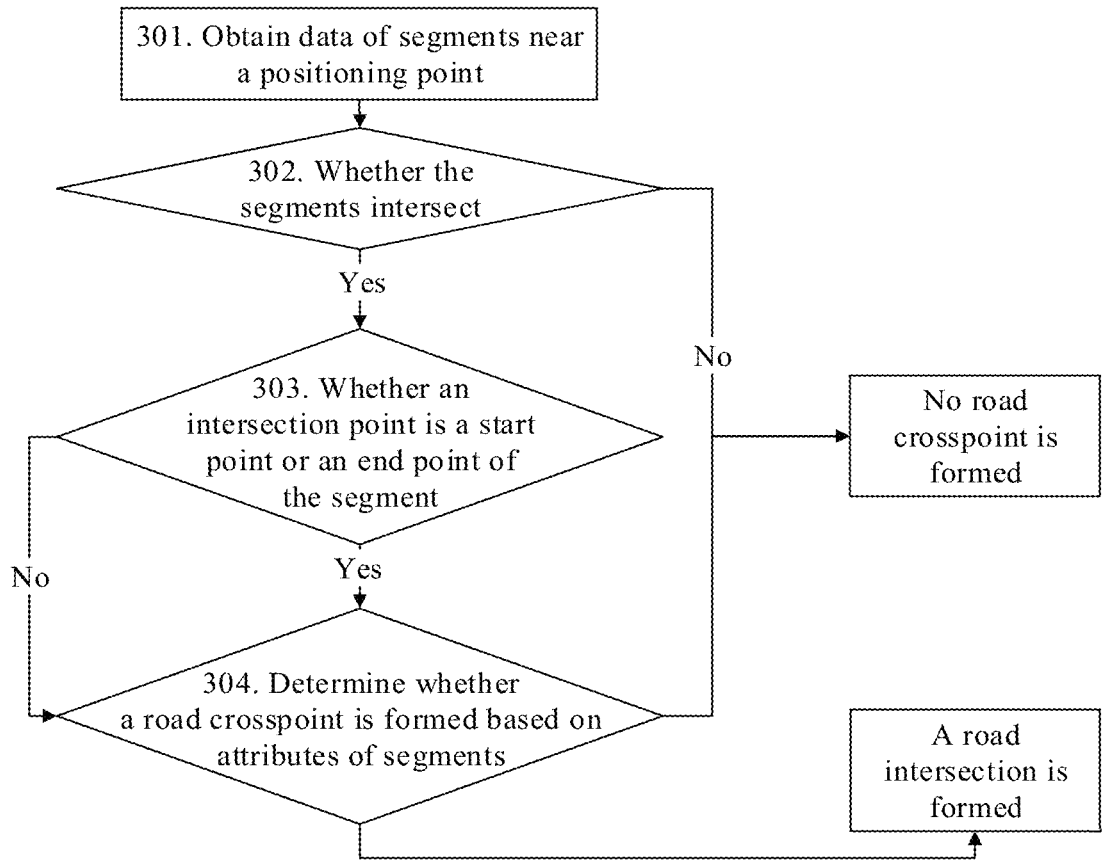
FIG. 7 is a schematic flowchart according to an embodiment of the present disclosure.

As described in steps 103 and 104, after a plurality of segments corresponding to the coordinates of the positioning point are found, the coordinates of the segment crosspoint are calculated based on the data of the segments, to construct a road network topology near the positioning point such that road matching can be subsequently performed based on the road network topology, to implement correction of the positioning point. The following describes in detail a specific process of generating a segment crosspoint based on data of segments, to construct a road network topology. As shown in FIG. 7, the process may include the following steps.

Step 301. Select data of segments near a positioning point.

In a tile area, a segment in a preset range near the positioning point is selected using the positioning point as a center point. Further, a segment located in a rectangular frame that is centered at the positioning point and that is +70 meters and −70 meters away from the positioning point, or a segment intersecting with the rectangular frame may be selected as a segment near positioning information. In the embodiments provided in this application, visual display of an example of a segment may be represented as the following two cases a start point, an end point, and a driving direction (one-way or two-way), and road attributes (for example, a tunnel attribute). A display rule is as follows. The start point of the segment points to the end point, and an attribute display flag is added at the end point of the segment. The attribute display flag may be shown as follows.

Display description 1: Two-way+non-tunnel: segment
⎯⎯⎯⎯→

Display description 2: One-way+non-tunnel: segment
⎯⎯⎯⎯⎯⎯→

Display description 3: Two-way+tunnel: segment
⎯⎯⎯⎯▸

Display description 4: One-way+tunnel: segment
⎯⎯⎯⎯⎯⎯▸

Optionally, before step 301, whether a segment crosspoint near the positioning information needs to be calculated needs to be first determined. If the distance between the positioning information and the end point of the matched segment in step 104 in the previous positioning method is less than a preset distance, the segment crosspoint near the positioning information needs to be calculated again based on the positioning information.

If data of an intersection needs to be constructed, whether intersected segments form a segment crosspoint at an intersection point is determined based on relative coordinates of start points and end points of the segments and road attributes of the segments, that is, steps 302 to 304 are performed. If the data of the intersection does not need to be constructed, step 104 is performed.

Step 302. Determine whether any two segments intersect.

Any two segments are selected, and whether the two segments intersect is calculated based on relative coordinates of start points and end points of the two segments. A method for calculating whether two line segments intersect and a method for calculating coordinates of an intersection point are common methods of geometric calculation, and details are not described herein. If the segments do not intersect, no segment crosspoint is formed. If the segments intersect, step 303 is performed.

Step 303. Determine whether the start points and the end points of the two segments are connected.

In other words, step 303 is to determine whether the two segments are connected head to tail, in an embodiment, determine whether the start point of one segment is the end point of the other segment, and whether an intersection point is the start point of one segment and the end point of the other segment.

Step 304. Determine, based on road attributes of the two segments, whether the two intersected segments form a segment crosspoint.

For intersected segments, a rule for forming a segment crosspoint based on road attributes may include the following.

1. Between Segments with Common Road Attributes

The common road attributes include a non-elevated road attribute, a non-IC road attribute, a non-JCT road attribute, and a non-roundabout road attribute, and a common road is a non-tunnel attribute road. In other words, the common road is a road without a special attribute.

Figure 8A:
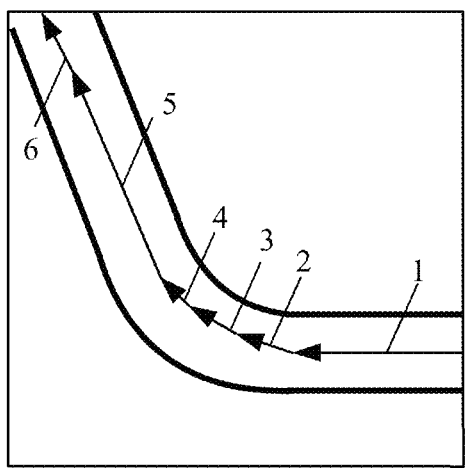
FIG. 8A is a schematic diagram of a curved road according to an embodiment of the present disclosure.

A segment crosspoint is not formed between segments that have a same common road attribute and a same driving direction attribute and whose start points and end points are connected, but a connected road is formed. FIG. 8A is a top view of a curved road. Segments 1 to 6 are all one-way driving segments of a same road type, and the types of the segments are all common roads. The segments 1 to 6 are connected head to tail such that the segments 1 to 6 form a connected road.

A segment crosspoint is formed between segments that have a same common road attribute and whose start points and end points are not connected. In other words, an intersection point is not at a start point of one segment and at an end point of the other segment at the same time, for example, a multi-way common road intersection point. For example, a real intersection includes a T-type intersection, a Y-type intersection, a crossroad, and a five-way intersection, and the intersection point of the segments forms a segment crosspoint.

Figure 8B:
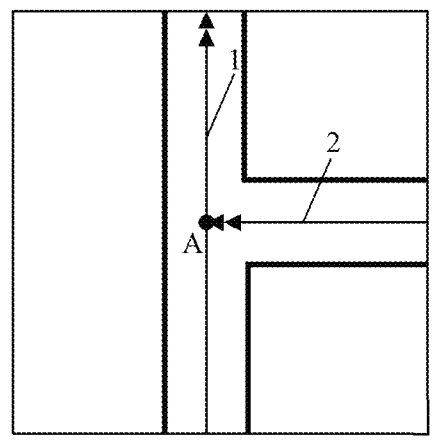
FIG. 8B is a schematic diagram of a T-type intersection according to an embodiment of the present disclosure.
Figure 8C:
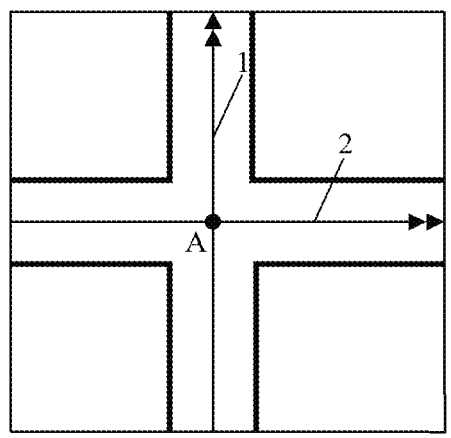
FIG. 8C is a schematic diagram of a crossroad according to an embodiment of the present disclosure.

FIG. 8B is a schematic diagram of a segment crosspoint formed at a T-type intersection. Segments 1 and 2 are two-way driving common roads, an intersection point A is located at an end point of the segment 2 and is located on the segment 1, but is not located at a start point or an end point of the segment 1. Therefore, the intersection point A is a segment crosspoint. FIG. 8C is a schematic diagram of a segment crosspoint formed at a crossroad. A segment 1 and a segment 2 are two-way driving common roads, an intersection point A is located on both the segment 1 and the segment 2, but is not located at start points and end points of the segment 1 and the segment 2. Therefore, the intersection point A is a segment crosspoint, and coordinates of the segment crosspoint are coordinates of the intersection point A.

Figure 9:
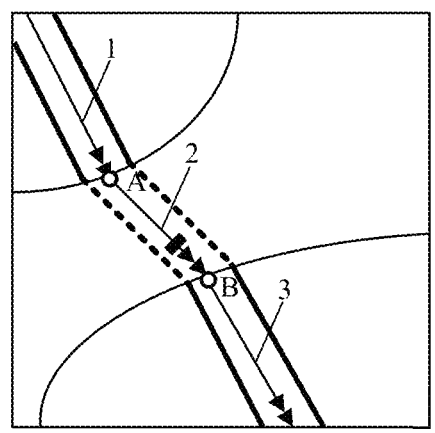
FIG. 9 is a schematic diagram of a tunnel according to an embodiment of the present disclosure.

2. Between Segments with a Tunnel Road Attribute and Another Road (Non-Tunnel Road) Attribute Respectively A segment crosspoint is formed between segments whose road attributes are a tunnel road and a non-tunnel road respectively and that are connected head and tail. The non-tunnel road is a road whose road attribute is not a tunnel, and may specifically include a common road, an elevated road, an IC road, a JCT road, a roundabout road, and a common road without a special attribute. FIG. 9 is a top view of a road that passes through a tunnel. A segment 2 is a two-way driving tunnel road, segments 1 and 3 are two-way driving non-tunnel roads, and the segment 1 and the segment 3 are respectively connected to a head and a tail of the segment 2. An intersection point A is an end point of the segment 1 and is a start point of the segment 2, an intersection point B is an end point of the segment 2 and is a start point of the segment 3, and the intersection points A and B are segment crosspoints.

3. Between Segments with an Elevated Road Attribute, an IC Road Attribute, a JCT Road Attribute, or a Roundabout Road Attribute If an intersection point between the segments with the elevated road attribute, the IC road attribute, the JCT road attribute, or the roundabout road attribute is a start point or an end point of a segment connected to the intersection point, the intersection point forms a segment crosspoint, or if the intersection point is not the start point or the end point of the segment, the intersection point does not form a segment crosspoint.

4. Between a Segment with an Elevated Road Attribute, an IC Road Attribute, a JCT Road Attribute, or a Roundabout Road Attribute and a Segment without these Attributes An intersection point between a segment with the elevated road attribute and a segment with a common road attribute does not form a crosspoint, and an intersection point between a segment with the JCT road attribute and the segment with the common road attribute does not form a crosspoint.

If an intersection point between a segment with the IC road attribute or the roundabout road attribute and a segment with the common road attribute is a start point or an end point of a segment connected to the intersection point, the intersection point forms a segment crosspoint, or if the intersection point is not the start point or the end point of the segment, the intersection point does not form a segment crosspoint.

Figure 10:
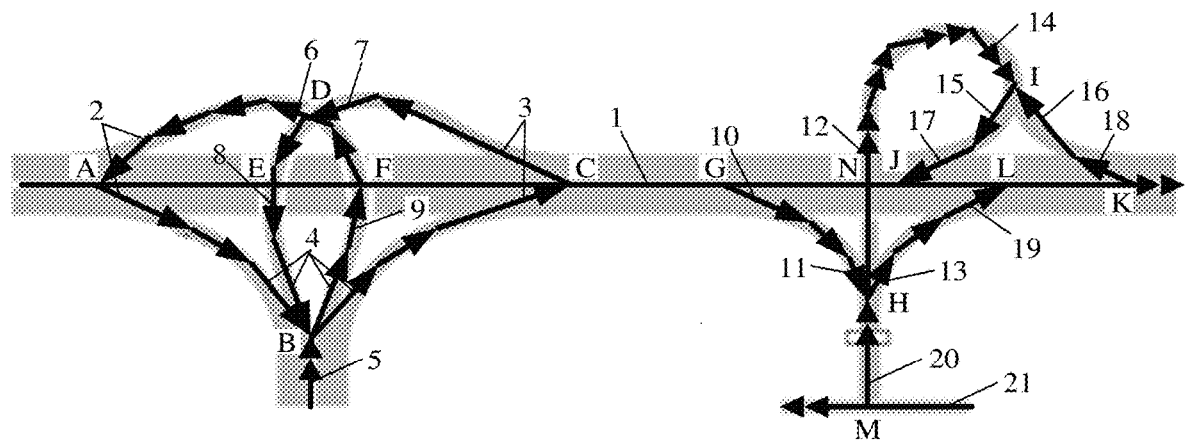
FIG. 10 is a schematic diagram of an IC and a JCT according to an embodiment of the present disclosure.

As shown in FIG. 10, segments 1 and 5 in FIG. 10 have the elevated road attribute, and segments 2 to 4 and 6 to 8 have the JCT road attribute. An intersection point A of the segments 1 and 2 is a start point or an end point of the segment 2, and therefore the intersection point A forms a segment crosspoint. An intersection point B of the segments 5 and 4 is a start point or an end point of the segments 4 and 5, and therefore the intersection point B forms a segment crosspoint. An intersection point C of the segments 2 and 3 is a start point or an end point of the segment 3, and therefore the intersection point C forms a segment crosspoint. An intersection point D of the segments 6 and 7 is not a start point or an end point of the segment 6 or 7, and therefore the intersection point D does not form a segment crosspoint. An intersection point E of the segments 8 and 1 is not a start point or an end point of the segment 8 or 1, and therefore the intersection point E does not form a segment crosspoint. An intersection point F of the segments 9 and 1 is not a start point or an end point of the segment 9 or 1, and therefore the intersection point F does not form a segment crosspoint.

As shown in FIG. 10, segments 10 to 19 in FIG. 10 have the IC road attribute, and segments 20 and 21 have the common road attribute. An intersection point G of the segments 10 and 1 is a start point of the segment 10, and therefore the intersection point G forms a segment crosspoint. An intersection point H of the segments 11, 12, 13, and 20 is a start point or an end point of the segments 11, 12, 13, and 20, and therefore the intersection point H forms a segment crosspoint. An intersection point I of the segments 14, 15, and 16 is a start point or an end point of the segments 14, 15, and 16, and therefore the intersection point I forms a segment crosspoint. An intersection point J of the segments 17 and 1 is an end point of the segment 17, and therefore the intersection point J forms a segment crosspoint. An intersection point K of the segments 18 and 1 is an end point of the segment 18, and therefore the intersection point K forms a segment crosspoint. An intersection point L of the segments 19 and 1 is an end point of the segment 19, and therefore the intersection point L forms a segment crosspoint. An intersection point M of the segments 20 and 21 is a start point of the segment 20, and therefore the intersection point M forms a segment crosspoint. An intersection point N of the segments 12 and 1 is not a start point or an end point of the segment 12 or 1, and therefore the intersection point N does not form a segment crosspoint.

Figure 11:
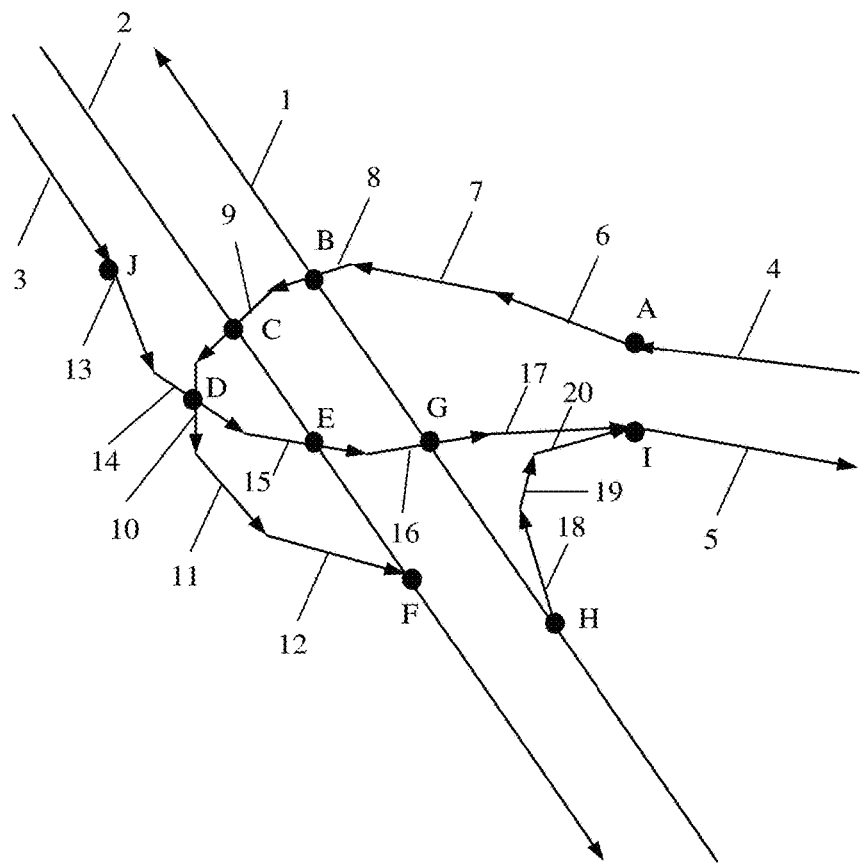
FIG. 11 is a schematic diagram of an IC according to an embodiment of the present disclosure.

As shown in FIG. 11, segments 1 to 5 to are elevated roads, segments 6 to 20 are IC roads, intersection points A, F, H, I, and J form segment crosspoints, but intersection points B, C, D, F, and G do not form segment crosspoints.

Figure 12:
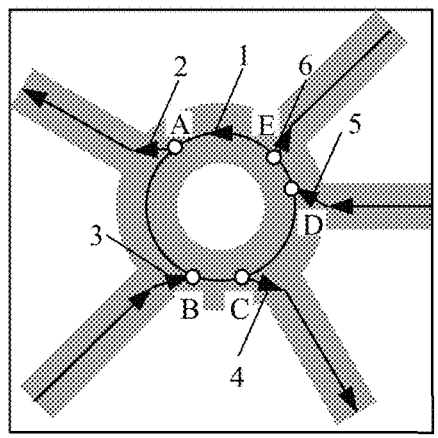
FIG. 12 is a schematic diagram of a roundabout according to an embodiment of the present disclosure.

As shown in FIG. 12, a segment 1 in FIG. 12 has a roundabout road attribute, and has a ring shape. Segments 2 to 6 have a non-roundabout road attribute, and may be respectively one of an elevated road attribute, a common road attribute, an IC road attribute, or a JCT road attribute. Intersection points of the segments 2 to 6 and the segment 1 are respectively points A, B, C, D, and E, and the intersection points A, B, C, D, and E are respectively a start point or an end point of the segments 2 to 6. Therefore, the intersection points A, B, C, D, and E form segment crosspoints.

Step 305. Obtain the data of the segments near the positioning point and data of a segment crosspoint, where the data of the segment crosspoint includes coordinates of the segment crosspoint and a connection relationship of the segments connected to the segment crosspoint.

Figure 13A:
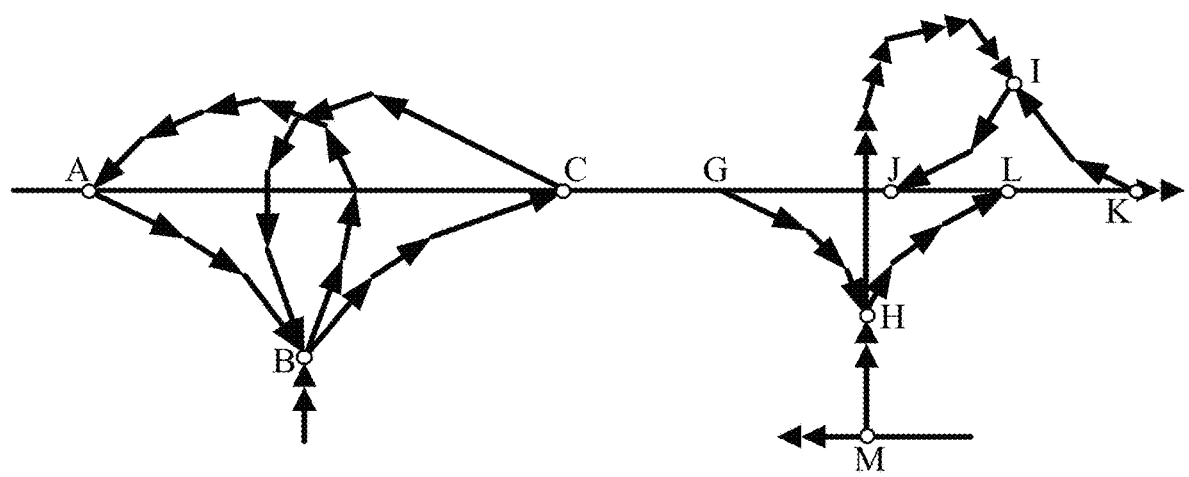
FIG. 13A is a schematic diagram of a road network topology corresponding to FIG. 10 according to an embodiment of the present disclosure.
Figure 13B:
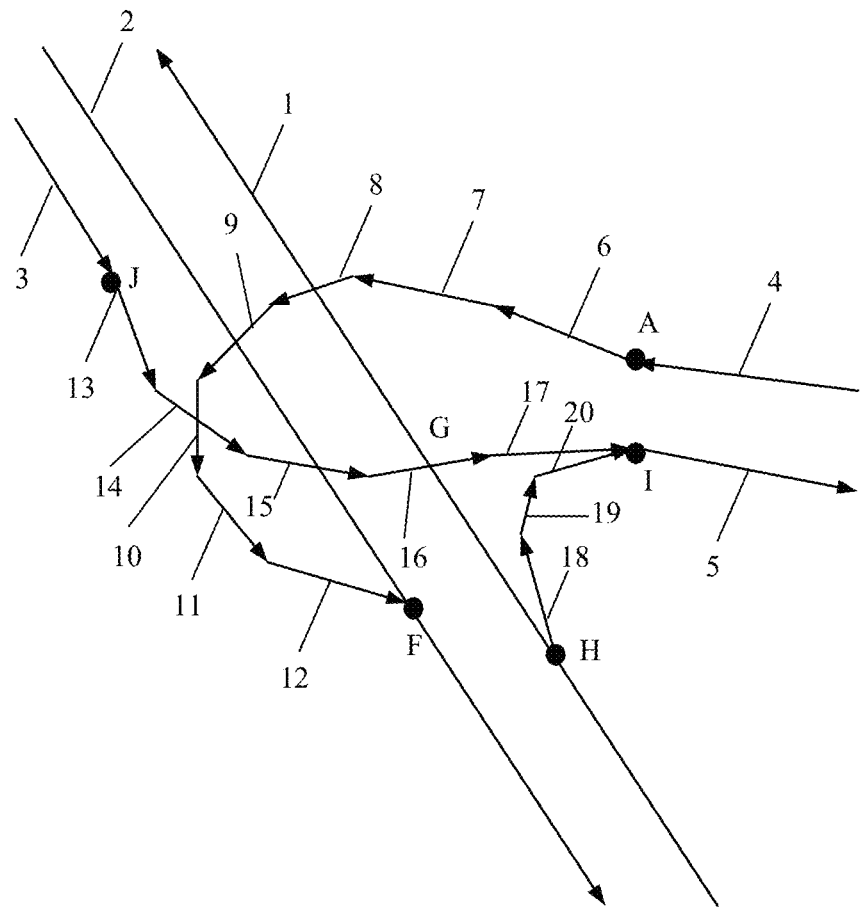
FIG. 13B is a schematic diagram of a road network topology corresponding to FIG. 11 according to an embodiment of the present disclosure.

Through the foregoing steps, a road network topology near the positioning point may be obtained. The road network topology includes segments and segment crosspoints, and the segment crosspoints represent connection relationships of the segments. A schematic diagram of a road network topology corresponding to FIG. 10 is shown in FIG. 13A, and a schematic diagram of a road network topology corresponding to FIG. 11 is shown in FIG. 13B.

The segments and the segment crosspoints herein are two core data structures of the road network topology. A start point, an end point, a road length, and a road attribute corresponding to road data are all stored in a segment. Data of a segment crosspoint includes coordinates of the segment crosspoint, where the coordinates and coordinates of the end point and start point of the segment may be relative coordinates obtained using a tile center point as an origin. The data of the segment crosspoint further includes a connection relationship of segments connected to the segment crosspoint. For example, the segment crosspoint is connected to a plurality of segments, and the segments are numbered and recorded in sequence.

Figure 14:
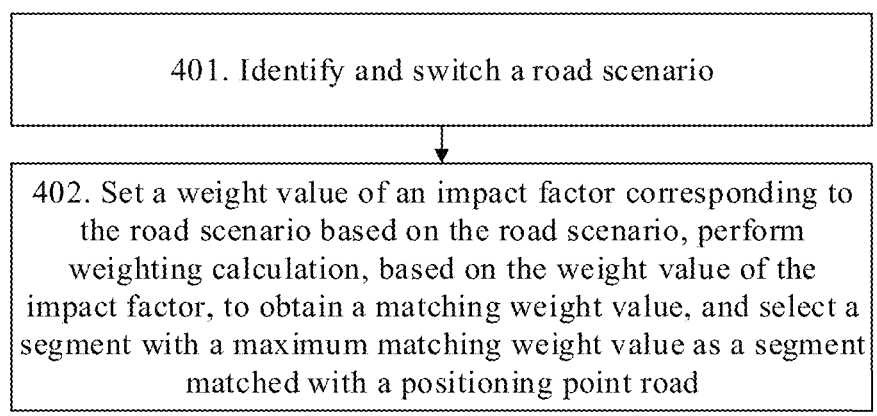
FIG. 14 is a schematic flowchart according to an embodiment of the present disclosure.

Because the coordinates of the positioning point may cause a deviation between the positioning point and an actual location due to various reasons, road matching is performed using the coordinates of the positioning point and the road network topology to correct the coordinates of the positioning point. In this embodiment provided in this application, a road scenario in which a positioning point is currently located is identified, and a corresponding road matching solution is used for different road scenarios. Specifically, a plurality of impact factors of a matching weight value may be set, and the impact factors of the matching weight value are adjusted for different road scenarios, to select a preferred matched road. The following describes in detail a process of performing positioning and correction in different scenarios. As shown in FIG. 14, the process may include the following steps.

Step 401. Identify and switch a road scenario.

Figure 15:
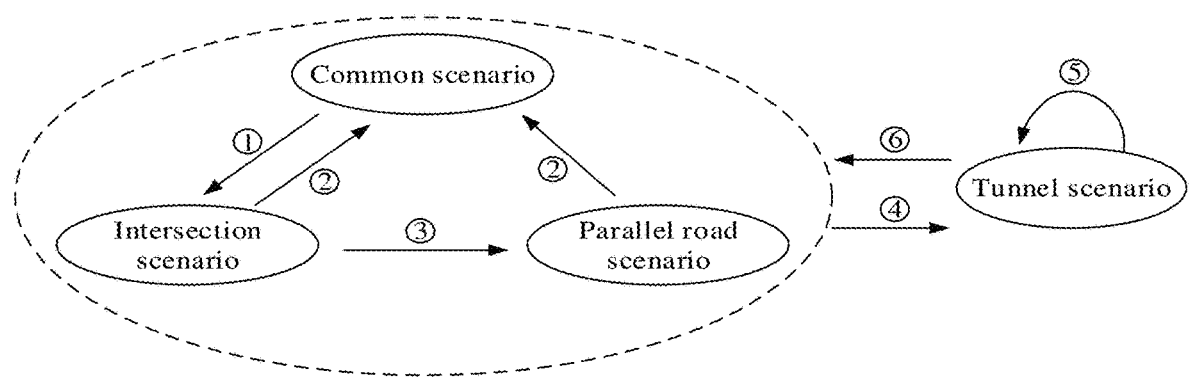
FIG. 15 is a schematic diagram of scenario switching according to an embodiment of the present disclosure.

Further, the road scenario may be identified based on an attribute of a segment near a positioning point and a quantity of segments. The road scenario can be roughly classified into a tunnel scenario, a common scenario, an intersection scenario, and a parallel road scenario. FIG. 15 shows a state diagram of scenario identification and switching between scenarios.

The tunnel scenario represents a scenario of driving on a road including a tunnel attribute, for example, the segment 2 in FIG. 10. A common tunnel includes a tunnel crossing a sea or a tunnel crossing a valley. A long tunnel has a length of nearly 10,000 meters, and a short tunnel such as a cross-street flyover has a length of tens of meters. In an initial state, whether a current road scenario is a tunnel scenario may be determined based on a tunnel flag. The tunnel flag described herein may be a common determining method, for example, the tunnel scenario is determined based on whether a GNSS signal is completely lost, or using a visible light sensor, and tunnel flag information is sent. Alternatively, the tunnel scenario is determined based on whether the segment near the positioning point has a tunnel road attribute. As shown by ④ in FIG. 15, in a non-tunnel scenario, such as a common scenario, an intersection scenario, or a parallel road scenario, if it is identified that the road scenario is a tunnel scenario, the road scenario is switched to the tunnel scenario. As shown by ⑤ in FIG. 15, in a tunnel scenario, a current road scenario may be periodically determined, and if the tunnel flag is still valid or a current road is switched to another tunnel road, the tunnel scenario is still maintained. As shown by ⑥ in FIG. 15, in a tunnel scenario, if the tunnel flag is invalid, for example, if a GPS signal/a GNSS signal appears or the visible light sensor determines that the positioning point is in the open air, it may be determined that the positioning point is not in the tunnel scenario currently, and the road scenario exits from the tunnel scenario. In addition, it may be determined, based on another condition, that the road scenario is to be switched to a corresponding scenario.

The common scenario represents a scenario of driving on a common road. There is no intersection at a front part and a rear part of the common road, and the common road has a shape of a straight line, a curve, or a turn. The common scenario is different from a cross road scenario. In an initial state, if there is no segment crosspoint within a range around the positioning point, a current scenario is a common scenario. As shown by ② in FIG. 15, if the current scenario is an intersection scenario or a parallel road scenario, and in a previous road matching result, a distance between the positioning point and an end point of a segment matched with the positioning point is greater than a second distance for a plurality of times, the current scenario is switched to the common scenario. Specifically, the second distance T2 may be adjusted based on a current driving speed. For example, if the speed is greater than 72 km per hour (km/h), T2=120 meters, if the speed is less than 72 km/h and greater than 36 km/h, T2=60 meters, and if the speed is less than 36 km/h, T2=30 meters.

The intersection scenario represents a scenario of driving at an intersection. There are at least two segments connected to a segment crosspoint to show a multi-way state, for example, an intersection scenario with a T-type intersection, a Y-type intersection, a crossroad, or a five-way intersection. Generally, a range of the intersection scenario can be limited to a range near an intersection. When the positioning point drives on one road of the intersection and moves away from the intersection by a specific range, the positioning point exits the intersection scenario, and switches to a common scenario. As shown by ① in FIG. 15, when road matching is performed in a common scenario, if a quantity of segments within a range of a first distance from an end point of a segment matched with the positioning point is greater than a first threshold, the road scenario is switched to an intersection scenario. Specifically, the first threshold is 1, and the segment matched with the positioning point is a segment matched with the positioning point in previous road matching. The first distance T1 may be a positioning error, namely, a distance between the positioning point and a matched point, or may be a sum of a positioning error, a positioning mode error, and an uncertain range of an intersection. The positioning mode error may be selected based on a positioning mode of obtaining the positioning point, and errors of different positioning modes are as follows. An average error of the GNSS is 10 meters, an average error of WI-FI/ cell network positioning is 30 meters, and an average error of base station positioning is 100 meters. Generally, the uncertain range of the intersection is a range of 35 meters. The positioning point herein is the positioning information obtained in step 101, and the matched point is a positioning point after correction obtained according to step 104 in the previous road matching.

Figure 16:
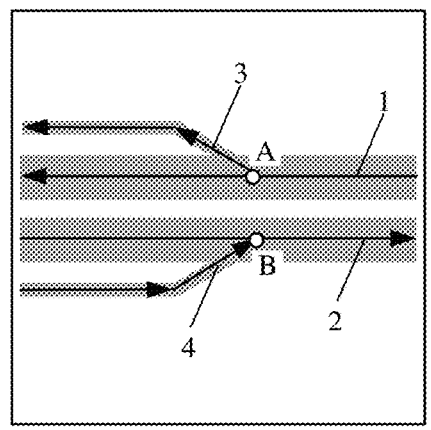
FIG. 16 is a schematic diagram of a parallel road scenario according to an embodiment of the present disclosure.

The parallel road scenario represents a special intersection scenario. There is a road with an elevated road attribute and a road with an auxiliary road attribute at the intersection. In addition, a distance between the auxiliary road and the elevated road is very small, and a deviation between running directions of the two roads is within a specific range. This case is separately defined as a parallel road scenario. FIG. 16 is a schematic diagram of parallel roads. Segments 1 and 2 have an elevated road attribute, segments 3 and 4 have an auxiliary road attribute, and points A and B form segment crosspoints. As shown by ③ in FIG. 15, if attributes of the segments in the intersection scenario include the elevated road attribute and the auxiliary road attribute, and a distance between segments that have a same direction and that respectively have the elevated road attribute and the auxiliary road attribute, and an angle difference between running directions of the segments meet a threshold condition, for example, if the distance is within a range of 30 meters, and the angle difference between the two is less than 15 degrees, it may be considered in this case that the scenario corresponds to a parallel road scenario. During scenario switching, the intersection scenario in the previous moment may be switched to the parallel road scenario.

Step 402. Set a weight value of an impact factor corresponding to the road scenario based on the road scenario, perform weighting calculation based on the weight value of the impact factor, to obtain a matching weight value, and select a segment with a maximum matching weight value as a segment matched with a positioning point road.

The weight value of the impact factor may be correspondingly adjusted for the common scenario, the intersection scenario, and the parallel road scenario, to calculate the matching weight value, and the segment with the maximum matching weight value is selected as the segment matched with the positioning point road. The impact factor may be one or more of a distance from the positioning point to a candidate segment, an angle difference between a movement direction of the positioning point and a direction of the candidate segment, and a shape matching degree between the candidate segment and a historical positioning track. The impact factor may further include another attribute impact factor, for example, an attribute of a road speed limit or a road level. The movement direction of the positioning point may be obtained together with the coordinates of the positioning point, and may be calculated from a collected historical positioning signal. The direction of the segment is a direction from a start point of the segment to an end point of the segment.

In the common scenario, a process of performing positioning and correction through road matching is similar to most existing road matching solutions. The positioning point may be directly projected to the candidate segment, and a projected point of the positioning point on the segment is a matched point. A matching weight value of the candidate segment is obtained based on a distance between the positioning point and the matched point or a difference between an angle of the positioning point and a road running direction, or is obtained by performing weighted summation on impact factors of both the distance and the difference. A matched point on a candidate segment with a maximum matching weight value in all candidate segments is used as a final matching result, that is, used as the positioning point after correction. This method is relatively common and is not described herein.

A specific process of performing road matching in the intersection scenario and the parallel road scenario may include the following steps.

Step 501. Obtain a segment and a segment crosspoint in a road network topology in which a segment matched with a historical positioning point is located.

Figure 18:
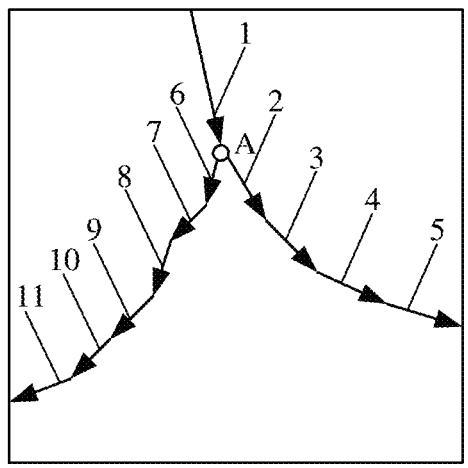
FIG. 18 is a schematic diagram of a road network topology according to an embodiment of the present disclosure.

The historical positioning point may be a positioning point in previous road matching, and a road network topology near the historical positioning point may be invoked from a cache. Steps 301 to 304 describe in detail the process of generating the road network topology, and details are not described herein again. FIG. 18 is a schematic diagram of a road network topology in an intersection scenario. If the segment matched with the historical positioning point before the intersection scenario is entered is a segment 1, a road network topology in which the segment 1 is located includes segments 2 to 6 and segment crosspoints A and B.

Step 502. Calculate a matching weight value between a current positioning point and each candidate segment.

The candidate segment is a segment connected to the segment matched with the historical positioning point. A start point of the candidate segment coincides with an end point of the segment matched with the historical positioning point. The matching weight value is obtained by performing weighting calculation on one or more impact factors, including a distance from the positioning point to the candidate segment, an angle difference between an angle of the positioning point and an angle of the candidate segment, and a shape matching degree between the candidate segment and a historical positioning track.

A calculation formula of the matching weight value may be the matching weight value=the distance from the positioning point to the segment×$k1$+ the angle difference×$k2$+the shape matching degree×$k3$+another attribute impact factor×$k4$.

Herein, k1 corresponds to a weighting coefficient of the distance from the positioning point to the segment, k2 corresponds to a weighting coefficient of the angle difference between the angle of the positioning point and the angle of the road direction, k3 corresponds to a weighting coefficient of a shape matching result, and k4 is a weighting coefficient of another connected road attribute impact factor. The weighting coefficients described herein meet a constraint condition k1+k2+k3+k4=1. Typically, in an intersection scenario, preferred coefficients are k1=0.3, k2=0.1, k3=0.5, and k4=0.1, where k4 corresponds to a weighting coefficient of a road level attribute. In a parallel intersection scenario, the value coefficients are optimized separately, for example, k1=0.2, k2=0.4, k3=0.2, and k4=0.1, where k4 corresponds to a weighting coefficient of a speed limit difference.

Figure 17:
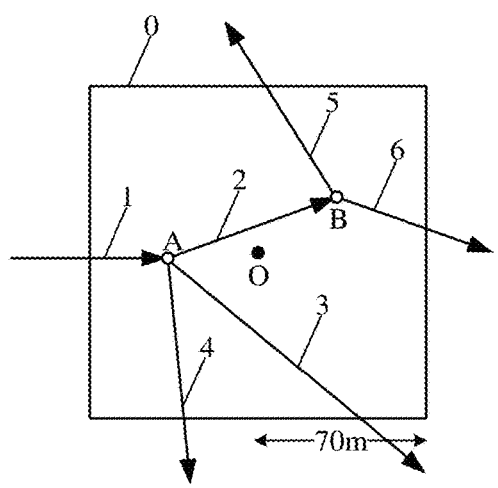
FIG. 17 is a schematic diagram of a road network topology according to an embodiment of the present disclosure.

As shown in FIG. 17, if the historical positioning point is matched to a segment 1, segments 2 to 4 are connected to the segment 1 using a segment crosspoint A, start points of the segments 2 to 4 and an end point of the segment 1 coincide at the segment crosspoint A, and the start points of the segments 2 to 4 are the end point of the segment 1, the segments 2 to 4 are candidate segments of a positioning point O. For example, if the historical positioning point is matched to the segment 2 based on an intersection matching algorithm, the candidate segments are segments 5 and 6 connected using a segment crosspoint B as a start point. For example, if the historical positioning point is matched to the segment 3 based on a road matching algorithm of the intersection scenario, a start point of a candidate segment coincides with an end point of the segment 2.

For example, as shown in FIG. 18, when the positioning point moves near a segment crosspoint A, if the positioning point is switched from a matched segment 1 to a segment 2, during subsequent road matching of the positioning point, the positioning point is to be matched with segments 2 to 5, which are candidate segments, until the positioning point arrives at a next segment crosspoint and enters a corresponding road scenario for road matching. The positioning point is not to be matched with adjacent segments 6 to 11, that is, the segments 6 to 11 do not become candidate segments, because the segments 6 to 11 and the segments 2 to 5 do not form a connected road. The segments matched with the positioning point follow a segment connected to a segment previously matched with the positioning point.

Optionally, before step 502, the process further includes predicting coordinates of the positioning point to form a historical positioning track.

In consideration that after the road scenario is switched to a new road scenario, there are few historical positioning points in the new scenario, it is difficult to perform shape matching between the historical positioning track and a segment. The shape matching means calculating a similarity between a candidate segment and a track formed by a historical positioning point. A method for predicting the coordinates of the current positioning point may be performing prediction based on the track of the historical positioning point, or performing inertial derivation prediction based on sensor data of a terminal. For example, in FIG. 17, if the candidate segments are the segments 2 to 5, shape matching is separately performed between the candidate segments 2 to 5 and the historical positioning track, to obtain shape matching degrees corresponding to the candidate segments. Time integration is performed based on a previous positioning result, to obtain predicted values of coordinates, a speed, and a direction of the positioning point. In the shape matching method described herein, for example, dimension reduction processing may be performed using a supervised learning based classification algorithm, and two-dimensional shape matching is simplified into one-dimensional classification algorithm processing. Such a classification algorithm is relatively common, is not a focus of this patent, and is not described in detail herein.

Step 503. Select a candidate segment with a maximum matching weight value as a segment matched with the positioning point, and calculate coordinates of a projected point of the positioning point on the matched segment, where the coordinates of the projected point are coordinates of the positioning point after correction.

Optionally, before the candidate segment with the maximum matching weight value is selected as the segment matched with the positioning point, whether the matching weight value meets a weight value threshold requirement is determined. Specifically, the threshold requirement may be limited as follows. The matching weight value is greater than or equal to a value, and if it is determined that none of the matching weight values of the candidate segments meets the threshold requirement, the segment with the maximum matching weight value is not output as a segment matched with the positioning point, then the road matching process is exited, and re-initialization is performed. If it is determined that the matching weight values of the candidate segments meet the threshold requirement, the candidate segment with the maximum weight value is selected, from the candidate segments that meet the threshold requirement, as the segment matched with the positioning point.

Optionally, if the coordinates of the positioning point after correction are located within a preset range of a segment crosspoint, the coordinates of the positioning point after correction are changed to coordinates of the segment crosspoint. For a positioning point that has just entered an intersection, because cross connection relationships in the intersection are complex, and there is an excessively small quantity of positioning points on a new segment just after a road scenario is switched to an intersection scenario, a quantity of shape matching samples is relatively small, and an error probability is increased. Herein, segment crosspoint shrinkage policy processing is performed on the positioning point that has just entered the intersection, that is, within a range of an error radius corresponding to a crosspoint of the intersection, a matching result is shrunk to directly output coordinates of a segment crosspoint, and accuracy of shape matching is improved after a specific amount of positioning point data is accumulated, to further improve accuracy of road matching. The error radius described herein is generally 15 meters based on experience for applying a common GNSS positioning result.

In another embodiment, in a parallel road scenario, whether it is necessary to switch a positioning point from a main road (elevated road) to an auxiliary road or from an auxiliary road to a main road (elevated road) may also be determined by identifying an angle change of a connected segment and comparing the angle change with an experiential threshold. One angle difference described herein is an angle change value A1 that is in a historical time period and that is recorded by a mobile phone sensor gyroscope, and the other angle difference is an angle difference A2 between segments that are in front-rear connection in a road network topology. By calculating a difference between A1 and A2 and comparing the difference with a preset threshold, whether a corresponding positioning result is switched is determined. For example, the historical time period herein may be 5 seconds, and the change may be a change between average values of 1 s before and after a sliding window of the gyroscope, and the preset angle difference threshold herein may be set to 15 degrees.

Similarly, if there is no branch in a tunnel scenario, a processing method is the same as that in a common scenario, and only one thing is added, that is, prediction of a location, a speed, and a direction of a positioning result is performed. When there is no effective positioning result after a tunnel is entered, a positioning result can be continuously and effectively output. For example, in the method, prediction may be directly performed based on a historical positioning track, or inertial derivation prediction may be performed based on sensor data of a mobile phone. This method is relatively common and is not described herein. If there is a branch in the tunnel scenario, a change of a movement angle may be obtained based on the sensor data, and a processing result is optimized with reference to a processing policy of the intersection scenario. Details are not described herein again.

With reference to the road network data provided in this application, scenario identification is performed on different road scenarios, information about impact factors such as a distance, an angle, shape matching of a historical track, and a road attribute is used in a corresponding matching result, and weight value adjustment is performed on different scenarios using weighting coefficients such that overall matching performance is more robust and more accurate. In addition, a crosspoint shrinkage processing policy is used for the intersection scenario, thereby effectively avoiding a case in which a matching point is likely to jitter and cause an error in a real-time positioning scenario when the matching point just enters an intersection.

As described in step 101a, when the road network data of the city in which the positioning point is located is not in road network data locally stored in the terminal, and it is learned that the road network data of the city changes, the terminal needs to request data update.

Figure 19:
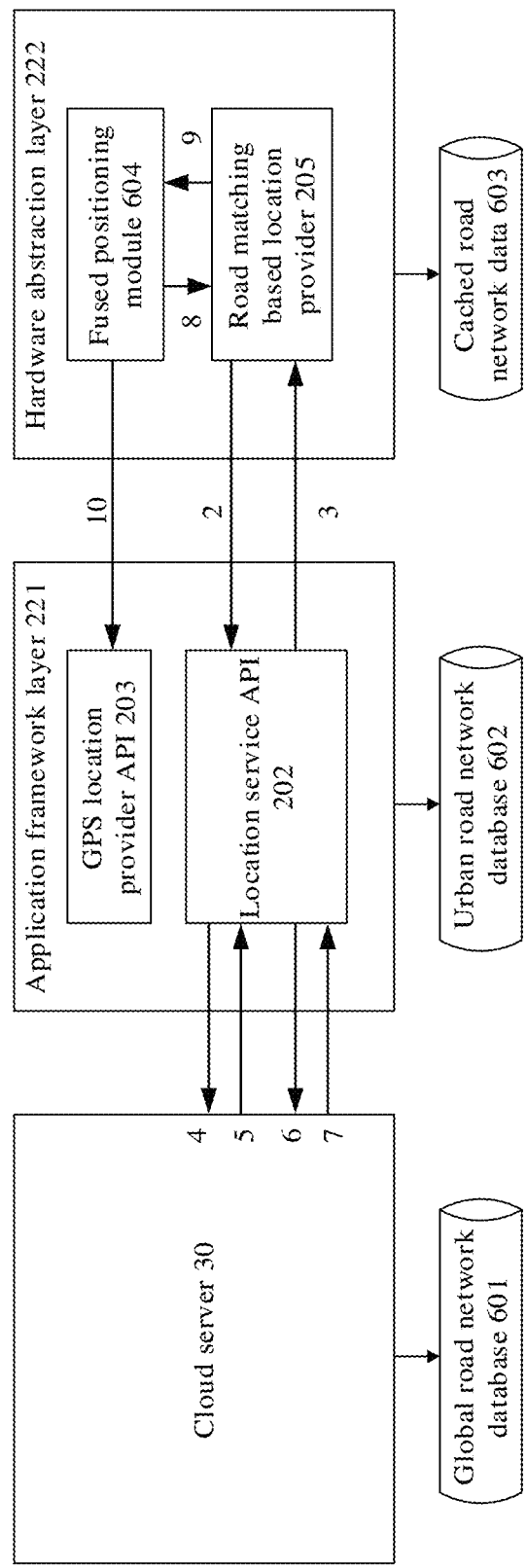
FIG. 19 is a schematic diagram of data updating according to an embodiment of the present disclosure.

As shown in FIG. 19, the application framework layer 221 and the hardware abstraction layer 222 in the electronic device 10 in FIG. 2 are included. The road matching based location provider 205 is configured to splice and send a data request according to a given protocol to search for road network data (data of a segment) near the positioning point, receive the data according to the given protocol, and perform the positioning method provided in this embodiment of this application, to calculate a segment crosspoint, and correct the positioning point using road matching to output a positioning result, or directly correct the positioning point by directly invoking cached segment crosspoint and road network topology data in road network data 603 cached during previous positioning. The location service API 202 is configured to receive the data request sent by the road matching based location provider 205, and search, based on the coordinates of the positioning point, an urban road network database 602 for data of a segment near the positioning point. Specifically, conversion may be performed based on the coordinates of the positioning point and a tile file name, to convert absolute latitudes and longitudes into an X_Y global number corresponding to the tile file name, and the coordinates may be encrypted according to a conventional rule. If a corresponding tile is not found, a data request is sent to the cloud server 30, to request, from a global road network database 601 stored in the cloud server 30, to update the urban road network database 602 stored in the terminal. The global road network database 601 and the urban road network database 602 store data of corresponding segments, and the cached road network data 603 stores data of one or more tiles meeting a memory size, and caches data of segments in one or more tiles near the positioning point.

Figure 20:
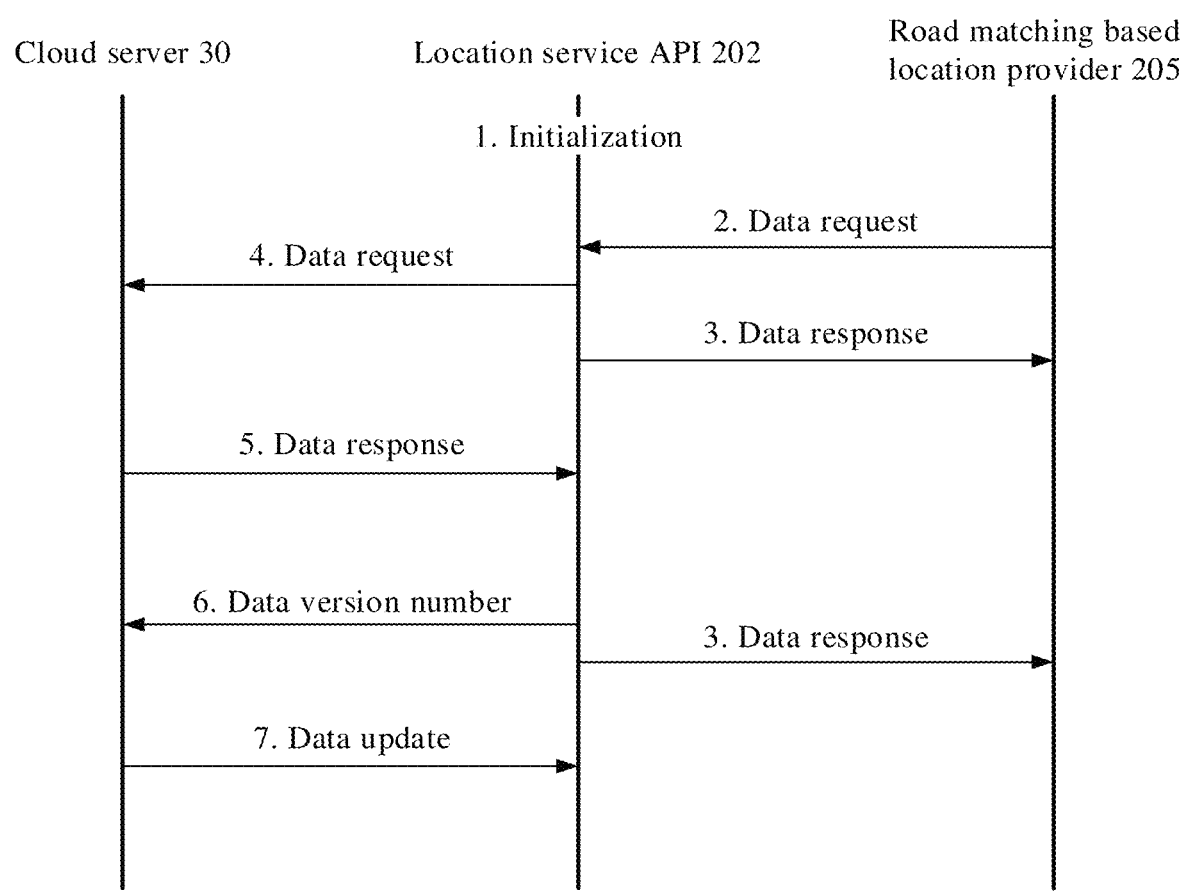
FIG. 20 is a schematic diagram of information exchange of a data updating process according to an embodiment of the present disclosure.

FIG. 20 shows a data request and update process.

1. Perform initialization, and preset a data file as required.

2. The road matching based location provider 205 requests, from the location service API 202, to search the urban road network database 602 for the data of the segments near the positioning point, where a request message includes the coordinates of the positioning point (for example, GPS absolute latitude and longitude coordinates) and a remaining space of a terminal memory.

3. If the urban road network database 602 of the location service API 202 has the currently requested data, data files of a tile corresponding to the coordinates of the positioning point and surrounding tiles are directly returned, where a quantity of the tiles herein depends on a limitation of a memory space of the terminal. In practice, the data may be data of one or more tiles.

4. If the location service API 202 does not have tile data corresponding to the current positioning point, the location service API 202 sends a data request to a cloud, to request, from the global road network database 601 stored in the cloud server 30, to search for and obtain data of a segment near the positioning point.

5. The cloud server 30 receives the data request of the location service API 202, and then searches global database files. If the data is found, a data file of an entire city is returned. If the data is found, an invalid flag is returned.

6. The location service API 202 periodically sends a data version number of the current urban road network database 602 to the cloud server 30.

7. The cloud server 30 detects the received data version number and compares the received data version number with a data version number of the city in the global road network database 601. If the data version numbers are consistent, processing is not performed, or if there is a change, a data file that is updated differentially is returned.

The process further includes the steps shown in FIG. 20.

8. Optionally, a fused positioning module 604 may provide the coordinates of the positioning point to the road matching based location provider 205, where the coordinates of the positioning point may be fused positioning coordinates obtained by fusing positioning results output in a plurality of types of positioning manners.

9. After the road matching based location provider 205 outputs coordinates of the positioning point after correction, the coordinates of the positioning point after correction may be sent to the fused positioning module 604, and the fused positioning module combines a positioning result output by the road matching based location provider 205 with a positioning result output in another positioning manner, to obtain a fused fix solution.

10. Optionally, the fused positioning module 604 provides the fused fix solution output in step 9 to the GPS location provider API 203, and the GPS location provider API 203 may send the positioning result to an application and present the positioning result to a user.

Figure 21:
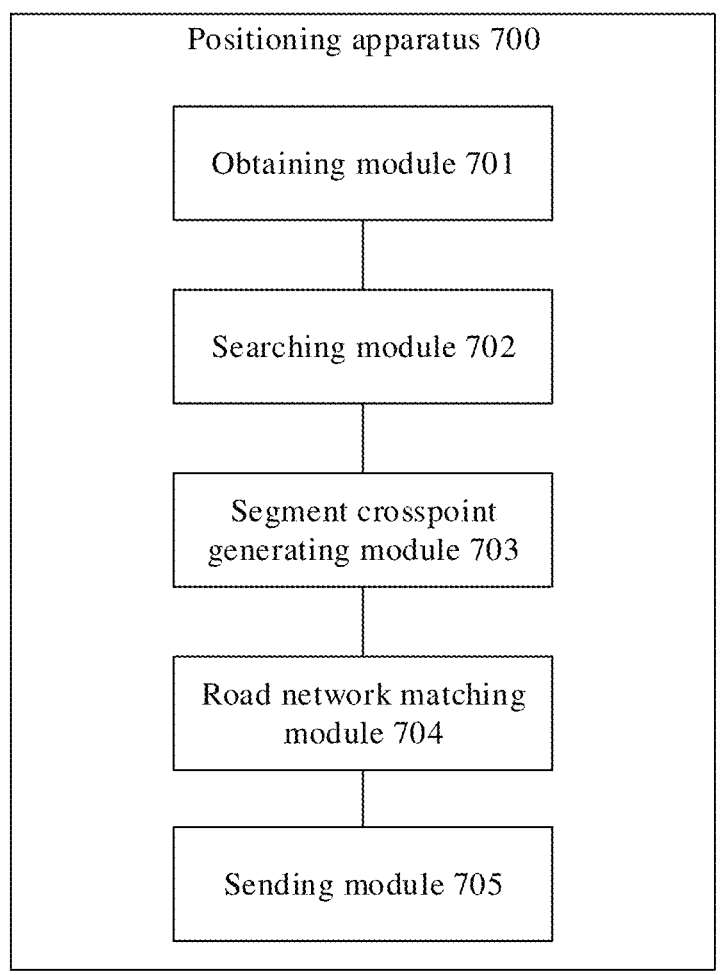
FIG. 21 is a schematic diagram of a positioning apparatus according to an embodiment of the present disclosure.

An embodiment of this application further provides a positioning apparatus. As shown in FIG. 21, the positioning apparatus includes an obtaining module 701, a searching module 702, a segment crosspoint generating module 703, and a road network matching module 704.

The obtaining module 201 is configured to perform step 101, and further, may be implemented using the foregoing various location providers (for example, 206 to 208 in FIG. 2) and the driver 209.

The searching module 702 is configured to perform step 102, and further, may be implemented using the foregoing location service API.

The segment crosspoint generating module 703 is configured to perform step 103, step 104, and steps 301 to 305, and further, may be implemented using the road matching based location provider 205.

The road network matching module 704 is configured to perform step 105, steps 401 and 402, and steps 501 to 503, and further, may be implemented using the road matching based location provider 205.

The sending module 705 is configured to perform step 106, and optionally, may be implemented using an interface API, further, for example, the GPS location provider API 203.

Based on the foregoing embodiments, an embodiment of this application further provides a chip subsystem, e.g. an SOC. The chip subsystem includes an application processor and a GPS module configured to receive a positioning signal, and the application processor may implement the positioning method provided in any one or more of the foregoing embodiments. The GPS module may be an independent chip, or may be integrated with the application processor.

Based on the foregoing embodiments, an embodiment of this application further provides an electronic device. The electronic device includes the foregoing chip subsystem, to enable the electronic device to implement the positioning method provided in any one or more of the foregoing embodiments.

Based on the foregoing embodiments, an embodiment of this application further provides a positioning chip, for example, a GPS chip. The chip includes a radio frequency module and a processor. The radio frequency module is configured to receive a positioning signal, and the processor is configured to implement the positioning method provided in any one or more of the foregoing embodiments.

Based on the foregoing embodiments, an embodiment of this application further provides an electronic device. The electronic device includes the foregoing positioning chip, to enable the electronic device to implement the positioning method provided in any one or more of the foregoing embodiments.

Based on the foregoing embodiments, an embodiment of this application further provides a computer storage medium. The storage medium stores a computer instruction, and when the computer instruction is read and executed by one or more processors, the positioning method provided in any one or more of the foregoing embodiments may be implemented. The computer storage medium may include any medium that can store program code or computer instructions, such as a universal serial bus (USB) flash drive, a removable hard disk, a ROM, a RAM, a magnetic disk, or an optical disc.

Based on the foregoing embodiments, this application provides a computer program product, where the computer program product includes a computer instruction, and when the computer instruction is executed by a processor, the processor is enabled to perform the positioning method provided in any one or more of the foregoing embodiments.

A person skilled in the art should understand that the embodiments of this application may be provided as a method, a system, or a computer program product. Therefore, this application may use a form of hardware-only embodiments, software-only embodiments, or embodiments with a combination of software and hardware. Moreover, this application may use a form of a computer program product that is implemented on one or more computer-usable storage media (including but not limited to a disk memory, a compact disc-ROM (CD-ROM), an optical memory, and the like) that include computer usable program code.

This application is described with reference to the flowcharts and/or the block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine such that the instructions executed by a computer or a processor of any other programmable data processing device generate an apparatus for implementing a specified function in one or more processes in the flowcharts and/or in one or more blocks in the block diagrams.

These computer program instructions also may be stored in a computer-readable memory that can instruct the computer or any other programmable data processing device to work in a specific manner such that the instructions stored in the computer-readable memory generate an artifact that includes an instruction apparatus. The instruction apparatus implements a specified function in one or more processes in the flowcharts and/or in one or more blocks in the block diagrams.

These computer program instructions may be loaded onto the computer or any other programmable data processing device such that a series of operations and steps are performed on the computer or any other programmable device to generate computer-implemented processing. Therefore, the instructions executed on the computer or any other programmable device provide steps for implementing a specified function in one or more processes in the flowcharts and/or in one or more blocks in the block diagrams.

Apparently, a person skilled in the art can make various modifications and variations to this application without departing from the scope of this application. In this way, this application is intended to cover these modifications and variations of this application provided that they fall within the scope defined by the following claims of this application and their equivalent technologies.

What is claimed is:

1. A road matching based positioning method, comprising:
   obtaining coordinates of a positioning point in response to a positioning request of an application;
   obtaining data of a plurality of segments near the coordinates of the positioning point, wherein the data comprises attributes, start point coordinates, and end point coordinates of the plurality of segments;
   calculating, based on the start point coordinates and the end point coordinates of the plurality of segments, at least one intersection point formed by intersected segments of the plurality of segments;
   determining at least one segment crosspoint from the at least one intersection point based on attributes of the plurality of segments;
   obtaining coordinates of the at least one segment crosspoint, wherein the at least one segment crosspoint represents an intersection based on the plurality of segments;
   identifying a road scenario based on a location of the positioning point, wherein the road scenario is one of an intersection scenario, a parallel road scenario, or a tunnel scenario;
   setting a first weight value of an impact factor based on the road scenario;
   performing weighting calculation to obtain matching weight values of the plurality, of segments near the positioning point based on the impact factor and the first weight value;
   selecting a segment from the plurality of segments with a maximum matching weight value as a matched segment based on the road scenario of the positioning point;
   obtaining coordinates of the positioning point after correction, wherein the positioning point after correction is a projected point of the positioning point on the matched segment; and
   sending the coordinates of the positioning point after correction to the application.

2. The road matching based positioning method of claim 1, further comprising obtaining segment data of a city from a cloud, wherein the segment data comprises segment data of a plurality of areas of the city, and wherein the areas are based on dividing the city into longitudes and latitudes.

3. The road matching based positioning method of claim 1, wherein the intersection formed by the plurality of segments exists when the plurality of segments are not in head-to-tail connection, wherein the attributes of the plurality of segments are common roads, and wherein the head-to-tail connection means that a start point of a segment of the plurality of segments coincides with an end point of another segment of the plurality of segments.

4. The road matching based positioning method of claim 1, wherein the road intersection exists when the plurality of segments are in head-to-tail connection, and wherein:
   any of the attributes of the plurality of segments comprise a tunnel;
   each of the attributes of the plurality of segments is at least one of an elevated road, an inter change, a joint change, or a roundabout;
   the attributes of the plurality of segments are a common road and the inter change; or
   the attributes of the plurality of segments are the common road and the roundabout.

5. The road matching based positioning method of claim 1, wherein the impact factor comprises a distance from the positioning point to the segment, an angle difference between a direction of the segment and a movement direction of the positioning point, and a shape matching degree between a historical positioning track and the segment, wherein the historical positioning track is based on a historical positioning point.

6. The road matching based positioning method of claim 5, wherein the impact factor further comprises a road level or a speed limit difference.

7. The road matching based positioning method of claim 5, wherein a second weight value of the shape matching degree between the historical positioning track and the segment in the intersection scenario is greater than a third weight value of the shape matching degree in the parallel road scenario.

8. The road matching based positioning method of claim 5, wherein a fourth weight value of the angle difference between the direction of the segment and the movement direction of the positioning point in the intersection scenario is greater than a fifth weight value of the angle difference in the parallel road scenario.

9. The road matching based positioning method of claim 1, wherein the matched segment is one of the plurality of segments near the positioning point and is connected to another matched segment of a historical positioning point using the segment crosspoint.

10. The road matching based positioning method of claim 1, wherein the impact factor comprises a distance from the positioning point to a segment of the plurality of segments.

11. An electronic device, comprising:
    a processor; and
    a memory coupled to the processor and storing instructions that, when executed by the processor, cause the electronic device to:
       obtain coordinates of a positioning point in response to a positioning request of an application;
       obtain data of a plurality of segments near the coordinates of the positioning point, wherein the data of the plurality of segments comprises attributes, start point coordinates, and end point coordinates of the plurality of segments;
       calculate, based on the start point coordinates and the end point coordinates of the plurality of segments, at least one intersection point formed by intersected segments of the plurality of segments;
       determine at least one segment crosspoint from the at least one intersection point based on attributes of the plurality of segments;

obtain coordinates of the at least one segment crosspoint, wherein the at least one segment crosspoint represents an intersection based on the plurality of segments;

identify a road scenario based on a location of the positioning point, wherein the road scenario is one of an intersection scenario, a parallel road scenario, or a tunnel scenario;

set a first weight value of an impact factor based on the road scenario;

perform weighting calculation to obtain matching weight values of the plurality of segments near the positioning point based on the impact factor and the first weight value;

select a segment from the plurality of segments with a maximum matching weight value as a matched segment based on the road scenario of the positioning point;

obtain coordinates of the positioning point after correction, wherein the positioning point after correction is a projected point of the positioning point on the matched segment; and send the coordinates of the positioning point after correction to the application.

12. The electronic device of claim 11, wherein the instructions further cause the electronic device configured to obtain segment data of a city from a cloud, wherein the segment data comprises segment data of a plurality of areas of the city, and wherein the areas are based on dividing the city into longitudes and latitudes.

13. The electronic device of claim 11, wherein the intersection exists when the plurality of segments are not in head-to-tail connection, wherein the attributes of the plurality of segments are common roads, and wherein the head-to-tail connection indicates that a start point of a segment of the plurality of segments coincides with an end point of another segment of the plurality of segments.

14. The electronic device of claim 11, wherein the road intersection exists when the plurality of segments are in head-to-tail connection, and wherein one of the following:
any of the attributes of the plurality of segments comprise a tunnel;
each of the attributes of the plurality of segments is one of an elevated road, an inter change, a joint change, or a roundabout; the attributes of the plurality of segments are a common road and the inter change; or
the attributes of the plurality of segments are the common road and the roundabout.

15. The electronic device of claim 11, wherein the impact factor comprises a distance from the positioning point to a segment of the plurality of segments.

16. A system on chip (SOC), comprising:
a Global Positioning System (GPS) system configured to receive a positioning signal; and
an application processor coupled to the GPS system and the application processor configured to:

obtain coordinates of a positioning point in response to a positioning request of an application;

obtain data of a plurality of segments near the coordinates of the positioning point, wherein the data of the plurality of segments comprises attributes, start point coordinates, and end point coordinates of the plurality of segments;

calculate, based on the start point coordinates and the end point coordinates of the plurality of segments, at least one intersection points formed by intersected segments of the plurality of segments;

determine at least one segment crosspoint from the at least one intersection points based on attributes of the plurality of segments;

obtain coordinates of the at least one segment crosspoint, wherein the segment crosspoint represents an intersection or a road intersection based on the plurality of segments;

identify a road scenario based on a location of the positioning point, wherein the road scenario is one of an intersection scenario, a parallel road scenario, or a tunnel scenario;

set a first weight value of an impact factor based on the road scenario;

perform weighting calculation to obtain matching weight values of the plurality of segments near the positioning point based on the impact factor and the first weight value;

select a segment from the plurality of segments with a maximum matching weight value as a matched segment based on the road scenario of the positioning point;

obtain coordinates of the positioning point after correction, wherein the positioning point after correction is a projected point of the positioning point on the matched segment; and send the coordinates of the positioning point after correction to the application.

17. The SOC of claim 16, wherein the application processor is further configured to obtain segment data of a city from a cloud, wherein the segment data comprises segment data of a plurality of areas of the city, and wherein the areas are based on dividing the city into longitudes and latitudes.

18. The SOC of claim 16, wherein the intersection formed by the plurality of segments exists when the plurality of segments are not in head-to-tail connection, wherein the attributes of the plurality of segments are common roads, and wherein the head-to-tail connection means that a start point of a segment of the plurality of segments coincides with an end point of another segment of the plurality of segments.

19. The SOC of claim 16, wherein the road intersection exists when the plurality of segments are in head-to-tail connection.

* * * * *

UNITED STATES PATENT AND TRADEMARK OFFICE
CERTIFICATE OF CORRECTION

Page 1 of 1

PATENT NO. : 11,037,445 B2
APPLICATION NO. : 16/827134
DATED : June 15, 2021
INVENTOR(S) : Dandan Zeng and Yongliang Wang It is certified that error appears in the above-identified patent and that said Letters Patent is hereby corrected as shown below:

In the Claims

Claim 16, Column 32, Line 10: "intersection points formed" should read "intersection point formed"

Signed and Sealed this
Tenth Day of August, 2021

Drew Hirshfeld
*Performing the Functions and Duties of the
Under Secretary of Commerce for Intellectual Property and
Director of the United States Patent and Trademark Office*